(12) United States Patent
Jun et al.

(10) Patent No.: US 11,219,876 B2
(45) Date of Patent: Jan. 11, 2022

(54) PHOTOCHEMICALLY-ASSISTED SYNTHESIS OF LAYERED BIRNESSITE ($MNO_2$) NANOSHEETS

(71) Applicant: Washington University, St. Louis, MO (US)

(72) Inventors: Young-Shin Jun, St. Louis, MO (US); Haesung Jung, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 16/298,667

(22) Filed: Mar. 11, 2019

(65) Prior Publication Data

US 2019/0284061 A1  Sep. 19, 2019

Related U.S. Application Data

(60) Provisional application No. 62/640,966, filed on Mar. 9, 2018.

(51) Int. Cl.

| | |
|---|---|
| *B01J 19/12* | (2006.01) |
| *C01G 45/02* | (2006.01) |
| *H01M 4/505* | (2010.01) |
| *B82Y 40/00* | (2011.01) |
| *H01M 4/02* | (2006.01) |
| *B82Y 30/00* | (2011.01) |

(52) U.S. Cl.
CPC ............ *B01J 19/123* (2013.01); *B01J 19/127* (2013.01); *C01G 45/02* (2013.01); *H01M 4/505* (2013.01); *B01J 2219/0877* (2013.01); *B01J 2219/1203* (2013.01); *B82Y 30/00* (2013.01); *B82Y 40/00* (2013.01); *C01P 2002/72* (2013.01); *C01P 2002/76* (2013.01); *C01P 2002/77* (2013.01); *C01P 2002/85* (2013.01); *C01P 2004/24* (2013.01); *C01P 2006/40* (2013.01); *H01M 2004/028* (2013.01)

(58) Field of Classification Search
CPC ....... C01G 45/02; B01J 19/123; B01J 19/127; B01J 2219/1203; B01J 2219/0877; H01M 4/505; B82Y 40/00; C01P 2006/40; C01P 2004/24; C01P 2002/72; C01P 2002/85; C01P 2002/77; C01P 2002/76
USPC .............................. 204/157.51, 157.5, 157.4
See application file for complete search history.

(56) References Cited

U.S. PATENT DOCUMENTS

| | | | |
|---|---|---|---|
| 6,884,391 B1 * | 4/2005 | Khoe ........................ | C02F 1/74 422/24 |
| 2007/0215454 A1 * | 9/2007 | Sotoaka ................. | B01J 19/123 204/157.46 |
| 2013/0115453 A1 * | 5/2013 | Fan ........................ | H01G 11/46 428/372 |
| 2015/0321916 A1 * | 11/2015 | Coleman ................ | C01G 49/02 423/509 |

(Continued)

OTHER PUBLICATIONS

Machine translation of KR1046313 (Year: 2011).*

(Continued)

*Primary Examiner* — Nicholas A Smith

(57) ABSTRACT

A method of forming birnessite $\delta$-$MnO_2$ nanosheets is provided. The method includes oxidizing manganese ($Mn^{2+}$) in the presence of a source of nitrate and a light source.

14 Claims, 23 Drawing Sheets
(21 of 23 Drawing Sheet(s) Filed in Color)

(56) References Cited

U.S. PATENT DOCUMENTS

2016/0254528 A1* 9/2016 Yu .................. H01M 4/502
429/188

OTHER PUBLICATIONS

Machine translation of KR1046314 (Year: 2011).*
Ai et al, "Microwave-assisted green synthesis of MnO2 nanoplates with environmental catalytic activity," Materials Chemistry and Physics 111 (2008) 162-167 (Year: 2008).*
Matsumoto et al, "Photodeposition of Metal and Metal Oxide at the TiOx Nanosheet to Observe the Photocatalytic Active Site," J. Phys. Chem. C Lett. vol. 112, No. 31, 2008, pp. 1164-11616 (Year: 2008).*
Kim et al, "Enhanced Dissolution of Manganese Oxide in Ice Compared to Aqueous Phase under Illuminated and Dark Conditions," Environ. Sci. Technol. 2012, 46, 13160-13166 (Year: 2012).*
Sunda et al, "Photoreduction of manganese oxides in seawater and its geochemical and biological implications," Nature vol. 301 Jan. 20, 1983, pp. 234-236 (Year: 1983).*
Stone et al, "Reduction and Dissolution of Manganese(III) and Manganese(IV) Oxides by Organics: 2. Survey of the Reactivity of Organics," Environ. Sci. Technol. 1984, 18, 617-624 (Year: 1984).*
Sunda et al, "Photoreduction of manganese oxides in seawater," Marine Chemistry 46 (1994) 133-152 (Year: 1994).*
Zepp et al, "Nitrate-Induced Photooxidation of Trace Organic Chemicals in Water," Environ. Sci. Technol. 1987, 21, 443-450 (Year: 1987).*
Jung et al, "Photochemically-assisted Fast Abiotic Oxidation of Manganese and Formation of δ-MnO2 Nanosheets in Nitrate Solution," Electronic supplementary information to Chem. Commun., 2017, 53, 4445-4448 (Year: 2017).*
Codispoti et al, "Synthesis of primary production in the Arctic Ocean: III. Nitrate and phosphate based estimates of net community production," Progress in Oceanography 110 (2013) 126-150 (Year: 2013).*
Derwent abstract of KR-1046314 (Year: 2011).*
Derwent abstract of KR-1046313 (Year: 2011).*
Jung, H. et al., "Photochemically-Assisted Synthesis of Bimessite Nanosheets and Their Structural Alteration in the Presence of Pyrophosphate," ACS Sustainable Chem. Eng., 2017, pp. 10624-10632, vol. 5.
Jung, H. et al., "Photochemically assisted fast abiotic oxidation of manganese and formation of delta-MnO2 nanosheets in nitrate solution," Chem. Common., Apr. 25, 2017, pp. 4445-4448, vol. 53, No. 32.

* cited by examiner

PHOTOCHEMICALLY-ASSISTED SYNTHESIS OF LAYERED BIRNESSITE (MNO₂) NANOSHEETS

CROSS-REFERENCE TO RELATED PATENT APPLICATION

This patent application claims the benefit under 35 U.S.C. § 119(e) of U.S. Patent Application Ser. No. 60/640,966, entitled "PHOTOCHEMICALLY-ASSISTED SYNTHESIS OF LAYERED BIRNESSITE (MnO₂) NANOSHEETS," filed Mar. 9, 2018, which is incorporated by reference in its entirety.

GOVERNMENTAL RIGHTS

This invention was made with government support under CHE-1610728 awarded by the National Science Foundation. The government has certain rights in the invention.

FIELD

The disclosure is directed to methods of photochemically-assisted synthesis of layered birnessite $MnO_2$ nanosheets. Specifically, the disclosure relates to fast photo-oxidation of Mn in aqueous solution using environmentally abundant inorganic anions, such as nitrate.

BACKGROUND

Manganese is ubiquitous in environmental settings ranging from oceans to soils, and its multiple oxidation states make it highly redox active. Thus, the redox processes of Mn can affect the fate of micronutrients and heavy metals in environmental systems. $Mn^{2+}$ (aq) oxidation has an estimated half-life of 200-300 days in abiotic systems, and studies have only reported the abiotic inorganic oxidation from $Mn^{2+}$ (aq) to Mn(III). However, bacteria-mediated Mn oxidation is believed to be the biggest contributor to Mn oxidation in natural systems because fast Mn oxidation and the formation of $Mn(IV)O_2$ can occur in the presence of microorganisms. Consequently, an abiotic inorganic process has not been considered as a prominent oxidation pathway to Mn(IV).

Furthermore, while photochemical processes are important for triggering redox reactions in the cycling among aqueous $Mn^{2+}$ and solid phases of Mn(III) and Mn(IV) in surface water environments, most previous studies have focused on the role of light in the reduction of $MnO_2$. In addition to photo reduction, photochemically induced oxidation can also affect the fate and transport of Mn oxide nanoparticles, and the photo-catalytic reaction of water oxidation.

Among all Mn (hydr)oxide minerals, $\delta$-$MnO_2$ is one of the most abundant, and, due to its rich redox capability and unique two-dimensional (2D) structure, it is often of interest in engineering applications. The photochemistry of $\delta$-$MnO_2$ is also an emerging subject of interest in the catalysis of water oxidation. A recent study showed that disordered $\delta$-$MnO_2$ has high catalytic reactivity to the water-oxidation center of photosystem II. However, so far most bottom-up synthesis processes of $\delta$-$MnO_2$ have used in hydrothermal processes, which need heat energy.

Conventional abiotic processes have much slower oxidation kinetics than biotic processes, and in environmental systems, abiotic processes can only oxidize $Mn^{2+}$ to Mn(III). Therefore, the formation mechanism of natural Mn(IV) oxides has not been explained via abiotic processes. Mn(IV) is the most dominant oxidation state among natural Mn oxides. Also, Mn(IV) oxides are very useful for engineering applications such as catalysis and energy storages. For the syntheses of the Mn(IV) oxides, previous studies have used external heat and pressure to oxidize $Mn^{2+}$(aq) to Mn(IV) and nucleate Mn(IV) oxides. Environmentally benign and energy efficient processes to synthesize Mn(IV) oxides are very limited.

BRIEF SUMMARY

In an embodiment, a method of forming birnessite $\delta$-$MnO_2$ nanosheets is provided. The method includes oxidizing manganese ($Mn^{2+}$) in the presence of a source of nitrate and a light source.

In some embodiments, the method may include irradiating an aqueous solution comprising $Mn^{2+}$(aq) and a nitrate solution with a light source. The method may also include oxidizing the $Mn^{2+}$ (aq) to form Mn(IV) in the nitrate solution. The method may also include creating superoxides from photodecomposition of nitrate, and generating disordered $\delta$-$MnO_2$ nanosheets.

In some embodiments, the light source comprises one or more of natural sunlight, a UV lamp containing UV light above 300 nm, or a Xe lamp.

In some embodiments, the step of oxidizing $Mn^{2+}$ to Mn(IV) includes oxidizing $Mn^{2+}$ to form Mn(III) and oxidizing the Mn(III) to form the Mn(IV).

In some embodiments, the method may include increasing a concentration of the nitrate solution to accelerate the formation of $\delta$-$MnO_2$ nanosheets.

In some embodiments, the concentration of the nitrate solution is at least 0.1 mM.

In some embodiments, the formation of $\delta$-$MnO_2$ nanosheets takes a time ranging from 0.5 hrs to 6 hrs.

In some embodiments, the abiotic formation rate of the $\delta$-$MnO_2$ nanosheets is comparable to the formation rate of $\delta$-$MnO_2$ in microbial processes.

In some embodiments, a plurality of particles includes the $\delta$-$MnO_2$ nanosheets.

In some embodiments, a cathode of a Li-ion battery includes the plurality of particles.

In an embodiment, a method is provided for oxidizing manganese ($Mn^{2+}$) to Mn(IV). The method includes contacting Mn2+ to a source of nitrate and a light source.

In some embodiments, the method may include preparing an aqueous solution comprising $Mn^{2+}$ (aq), nitrate, and pyrophosphate (PP) having a concentration of at least 0.3 mM. The method may also include irradiating the aqueous solution using a light source and oxidizing the $Mn^{2+}$(aq) to form Mn(IV). The method may further include creating superoxides from photodecomposition of nitrate, and synthesizing disordered $\delta$-$MnO_2$ nanosheets. The stacking of $\delta$-$MnO_2$ nanosheets is enhanced by changing the birnessite structure from hexagonal to orthogonal in the presence of PP.

In some embodiments, the light source comprises one or more of natural sunlight, a UV lamp containing UV light above 300 nm, or a Xe lamp.

In some embodiments, the PP concentration is up to 2 mM.

In some embodiments, the proportion of Mn(III) in $\delta$-$MnO_2$ nanosheets increases with the PP concentration.

In some embodiments, when the PP concentration is between 1 mM and 2 mM, orthogonally structured $\delta$-$MnO_2$ nanosheets are formed to have Mn(III) predominantly in layers with fewer vacant sites than that when the PP concentration is between 0.3 mM and 0.5 mM, and when the PP concentration is between 0.3 mM and 0.5 mM, hexagonal structured δ-MnO$_2$ nanosheets are formed to have Mn(III) predominantly in the interlayers with more vacant sites than that when the PP concentration is between 1 mM and 2 mM.

In some embodiments, the step of oxidizing Mn$^{2+}$ to form Mn(IV) includes oxidizing Mn$^{2+}$ to form Mn(III) and oxidizing the Mn(III) to form the Mn(IV).

In some embodiments, the formation of δ-MnO$_2$ nanosheets takes a time ranging from 0.5 hrs to 6 hrs.

In some embodiments, a plurality of particles includes the δ-MnO$_2$ nanosheets.

In some embodiments, a cathode of a Li-ion battery includes the plurality of particles.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification and the drawings, which forms a part of this disclosure.

BRIEF DESCRIPTION OF THE DRAWINGS

The application file contains at least one drawing executed in color. Copies of this patent application publication with color drawing(s) will be provided by the Office upon request and payment of the necessary fee.

The description will be more fully understood with reference to the following figures and data graphs, which are presented as various embodiments of the disclosure and should not be construed as a complete recitation of the scope of the disclosure, wherein.

DETAILED DESCRIPTION

Figure 1A:
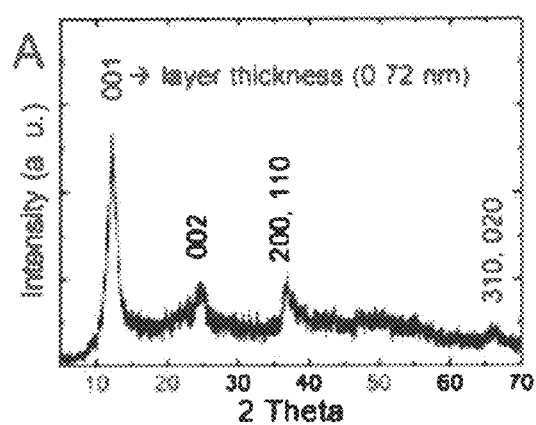
FIGS. 1A-D illustrate a layered morphology of the formed δ-MnO$_2$ nanosheets: (A) Layer thickness of the formed δ-MnO$_2$, measured by high-resolution X-ray diffraction (HRXRD) after 6 hours of reaction; (B) Layered morphology of the formed δ-MnO$_2$; (C) and (D) High-resolution X-ray diffraction images of the synthesized δ-MnO$_2$ nanosheets according to various embodiments.
Figure 1B:
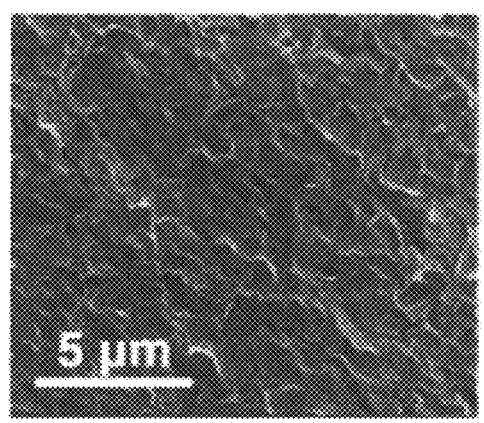
Figure 1C:
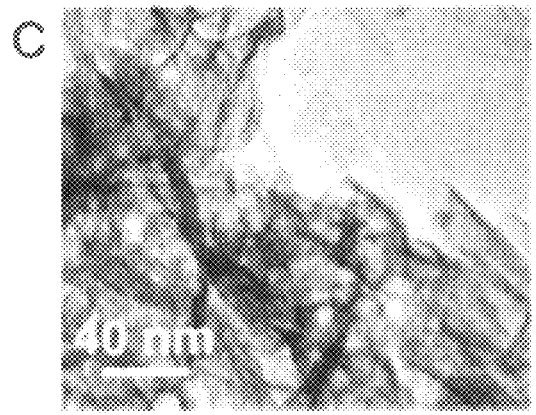
Figure 1D:
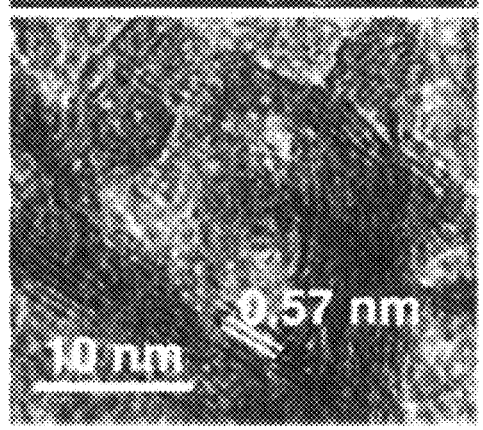

The disclosure may be understood by reference to the following detailed description, taken in conjunction with the drawings as described below. It is noted that, for purposes of illustrative clarity, certain elements in various drawings may not be drawn to scale.

The present disclosure, using the photolysis of nitrate, provides the fast oxidation of Mn$^{2+}$(aq) to Mn(IV)(s) and the formation of δ-MnO$_2$ nanosheets with tunable thicknesses and structures. This environmentally relevant system forms δ-MnO$_2$ nanosheets very fast comparable to microbial reactions. With the naturally abundant sources (i.e., nitrate and sunlight) and using generated reactive oxygen species, a sustainable chemical pathway to synthesize δ-MnO$_2$ nanosheets is described. Also, the one-pot synthesis, can be beneficial to reduce production-cost in practical operation. After the synthesis reaction, a waste nitrate solution can be re-used by adding only Mn$^{2+}$(aq). The reusable system can be helpful in saving operation costs and fostering environmental sustainability. The tunable size and structures of δ-MnO$_2$ nanosheets could also be of great benefit in meeting the diverse needs of the materials in engineered systems.

I. Photochemically Assisted Fast Abiotic Oxidation of Mn and Formation of δ-MnO$_2$ Nanosheets in a Nitrate Solution The present disclosure provides an abiotic, nature-mimicking system to generate δ-MnO$_2$ via a bottom-up process through Mn oxidation. Such a process could allow for the production of the catalyst via non-thermal green chemistry, and to have a better understanding of the photochemistry of Mn cycling in photochemical water-oxidation systems.

The present disclosure describes the photochemically-assisted oxidation of Mn$^{2+}$ (aq) in the presence of nitrate without microorganisms or organic matter. Nitrate is ubiquitous in natural environments, including atmospheric and aqueous systems. The disclosure shows how the naturally abundant anion, nitrate, can oxidize $Mn^{2+}$ (aq) to Mn(IV) at a rate comparable to that of biotic processes, and how to generate $\delta$-$MnO_2$ nanosheets via a green chemistry principle.

The disclosure provides an oxidative pathway, the photochemically-assisted fast abiotic oxidation of $Mn^{2+}$ (aq) to Mn(IV) in a nitrate solution, and the subsequent formation of $\delta$-$MnO_2$ nanosheets. The abiotic process is comparably as fast as biotic processes, which have hitherto been considered the dominant pathway of Mn oxidation in environmental systems. The fast oxidation occurs via the superoxide generated from nitrate photolysis. The oxidation of $Mn^{2+}$ (aq) to Mn(IV) occurs via two steps, each of which transfers one electron, with Mn(III) as an intermediate. The findings strongly suggest the importance of the photochemically-assisted abiotic pathway of Mn oxidation and the formation of $\delta$-$MnO_2$ nanosheets in natural systems. Driven by sunlight, this is a green process.

(i) Aqueous Systems

The first set of experiments was conducted with a solution sample containing 1 mM of nitrate and 100 µM of $Mn^{2+}$ (aq), at an initial pH of 8.9. The solution sample was irradiated by natural sunlight. Nanosheets of Mn (hydr) oxide were formed and $Mn^{2+}$ (aq) was oxidized to the Mn(IV) (s) state within 5 hours under abiotic conditions, where (s) stands for a solid phase.

To further explore the structural properties and oxidation mechanism of the particles formed in natural sunlight and to systematically control the experimental conditions, a 450 W Xe lamp was used to illuminate the solution samples for up to 6 hrs. Analyses of the crystal structure and morphology indicated that the particles formed under Xe lamp exposure were randomly stacked, layered birnessite nanosheets ($\delta$-$MnO_2$, which can be considered as hexagonal birnessite based on the identical structures of hexagonal birnessite and $\delta$-$MnO_2$).

FIGS. 1A-D illustrate the layered morphology of the formed $\delta$-$MnO_2$ nanosheets: (A) Layer thickness of the formed $\delta$-$MnO_2$, measured by high-resolution X-ray diffraction (HRXRD) after 6 hours of reaction; (B) Layered morphology of the formed $\delta$-$MnO_2$; (C) and (D) High-resolution images of the synthesized $\delta$-$MnO_2$ nanosheets. The smaller layer thickness observed in high-resolution transmission electron microscopy (HRTEM) than that in HRXRD results from the evaporation of intercalated water.

FIG. 1A shows a high resolution X-ray diffraction (HRXRD) pattern having XRD peaks at 2-thetas of 12.2°, 24.5°, 37°, and 66°, reflecting planes of $\delta$-$MnO_2$ (JCPDS no. 42-1317). The (001) reflection plane indicates that the layer thickness is about 0.72 nm.

Scanning electron microscopy (SEM) and high-resolution transmission electron microscopy (HRTEM) images (FIGS. 1B-D) show a sheet-like morphology with a nano-scale thickness of the layered birnessite. TEM images revealed that the total thickness of the nanosheet stacks was 3-5 nm, and each layer's thickness was 0.57 nm. The difference in thickness between the XRD and TEM measurements results from the shrinkage of nanosheets by the evaporation of water inside the $\delta$-$MnO_2$ structure in the high vacuum of the TEM sample chamber ($<10^{-5}$ Pa).

Figure 2A:
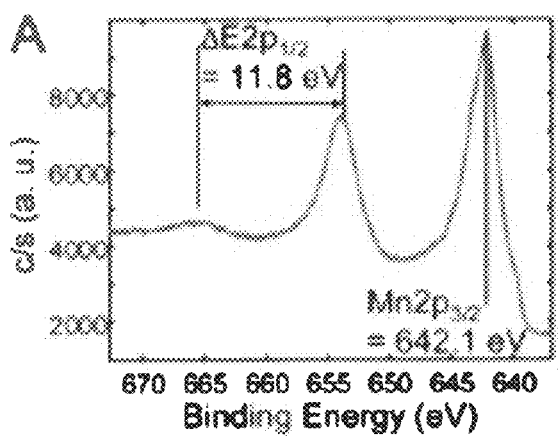
FIGS. 2A-D illustrate phase identification and oxidation state of the formed δ-MnO$_2$ nanosheets, using X-ray spectra: (A) Mn 2p X-ray photoelectron spectroscopy (XPS) spectra indicating the oxidation state of Mn(IV) based on the energy gap between Mn 2p$_{1/2}$ and the satellite peak, and the peak position of Mn 2p$_{3/2}$; (B) Mn 3s XPS spectra supporting the Mn(IV) oxidation state of the formed δ-MnO$_2$ nanosheets; (C) and (D) Similar X-ray absorption near edge structure (XANES) and k$^3$-weighted extended X-ray absorption fine structure (EXAFS) spectra (where k is the photoelectron wavenumber)
Figure 2B:
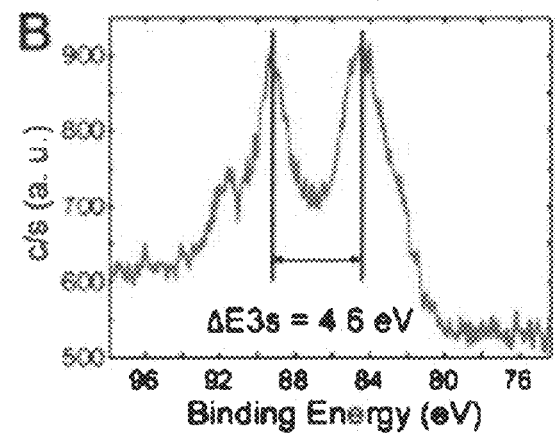
Figure 2C:
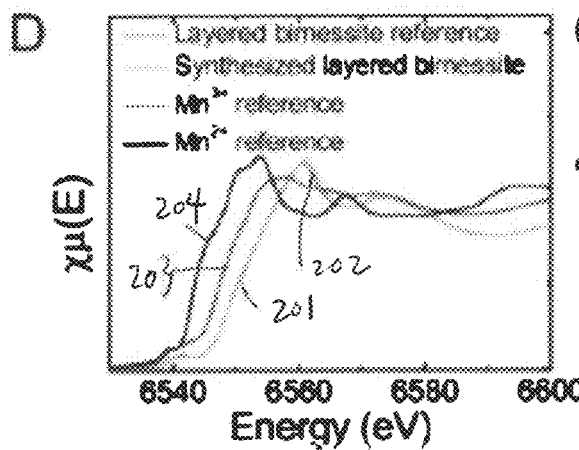
Figure 2D:
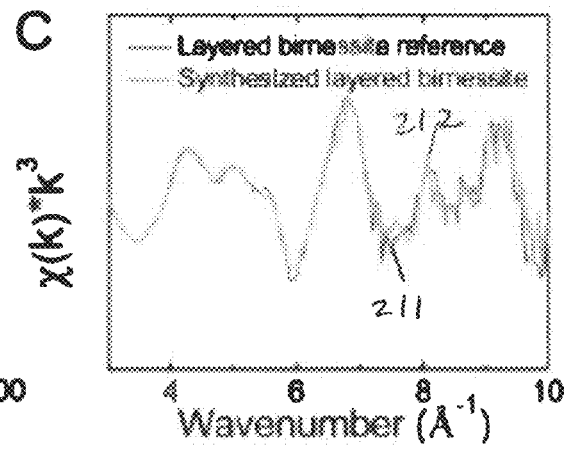

X-ray photoelectron spectroscopy (XPS) and X-ray absorption spectroscopy (XAS) were used to determine the oxidation state and phase identity of the synthesized birnessite. FIGS. 2A-D illustrate phase identification and oxidation states of the formed $\delta$-$MnO_2$ nanosheets, using X-ray spectra. (A) Mn 2p X-ray photoelectron spectroscopy (XPS) spectra indicating the oxidation state of Mn(IV) based on the energy gap between Mn $2p_{1/2}$ and the satellite peak, and the peak position of Mn $2p_{3/2}$; (B) Mn 3s XPS spectra supporting the Mn(IV) oxidation state of the formed $\delta$-$MnO_2$ nanosheets; (C) and (D) Similar X-ray absorption near edge structure (XANES) and $k^3$-weighted extended X-ray absorption fine structure (EXAFS) spectra (where k is the photoelectron wavenumber), along with a $\delta$-$MnO_2$ reference provided by the Advanced Photon Source (APS) GeoSoilEnviroCars sector 13. As shown in FIG. 2C, curves 201-202 represent synthesized layered birnessite and a layered birnessite reference, respectively. As shown in FIG. 2D, curves 211-212 represent synthesized layered birnessite and a layered birnessite reference, respectively, and curves 213-214 represent $M^{3+}$ and $M^{2+}$ references, respectively.

The difference between Mn $2P_{1/2}$ and the satellite peak ($\Delta E\ 2P_{1/2}$, FIG. 2A) was 11.8 eV, and the magnitude of Mn 3s multiple splitting ($\Delta E$ 3s, FIG. 2B) was 4.6 eV. As shown in FIG. 2C, Mn K-edge X-ray absorption near-edge spectroscopy (XANES) also confirmed that the position and shape of the absorbance maxima at 6562 eV best matched those of $\delta$-$MnO_2$. This XPS and XANES spectrum information indicates that Mn(IV) is the dominant oxidation state of the particles. In particular, the XPS spectra of Mn 3s and 0 1s show that the oxidation state of the synthesized $\delta$-$MnO_2$ is 3.79+ (FIG. 2B). Mn K-edge X-ray absorption fine structure (EXAFS) spectroscopy also showed a structure similar to that of $\delta$-$MnO_2$. Specifically, the single antinode at 8.0 Å corresponds to $\delta$-$MnO_2$ (FIG. 2D). The hexagonal symmetry of $\delta$-$MnO_2$ is also clearly shown in synchrotron-based X-ray diffraction data.

The structure of $\delta$-$MnO_2$ includes interlayer water and cations, which contribute to the electron balance between layers. Thermogravimetric analysis (TGA) indicated an approximate 10 wt % decrease by water evaporation at around 200° C. Because the experimental system also had a source of $Na^+$ in solution, $Na^+$ intercalated $\delta$-$MnO_2$ was expected. Intriguingly, XPS, energy dispersive spectrometry (EDS), and inductively coupled plasma mass spectroscopy (ICP-MS) measurements could not detect $Na^+$ in the formed particles. Therefore, $H_3O^+$ is most probably the species intercalated between the layers. Thus, the formed $\delta$-$MnO_2$ may be described as $H^+$—$MnO_2.0.6H_2O$, which is very active in ion-exchange reactions of cations, such as $Li^+$, $Mg^{2+}$, $Na^+$, $K^+$, or organic ammonium ions. This finding suggests promising applications, such as the production of $\delta$-$MnO_2$ nanosheets for use in Li-ion batteries, through selective ion-exchange. The nitrogen adsorption/desorption isotherms determined a surface area of 61 $m^2\ g^{-1}$ and a pore size or particle size of 1.8 nm for the $\delta$-$MnO_2$ nanosheets.

In some embodiments, the pore size ranges from 1 nm to 10 nm.

To explain the unexpectedly fast Mn oxidation, reactive oxygen species (ROS) may be generated from nitrate photoexcitation and that the photochemically-assisted reaction occurs via multiple electron transfers from $Mn^{2+}$ (aq) to Mn(IV) (s) under light exposure. To confirm the wavelength responsible for the reaction, a UV filter was installed on the light source to block the UV spectrum ($\lambda<400$ nm). UV-Vis spectra showed no absorbance change during the 4 hrs reaction with the UV filter in place. This finding indicates that the UV spectrum was responsible for nitrate photoexcitation, which occurs at around 305 nm. Then, to identify which ROS was responsible for the photochemical reaction, superoxide ($O_2.^-$) and hydroxyl radical (OH.) were scavenged by 0.5 µM of superoxide dismutase (SOD) and 0.1 M of tert-butyl alcohol (t-BuOH), respectively. These two radicals are strong oxidizers in natural systems.

Figure 3A:
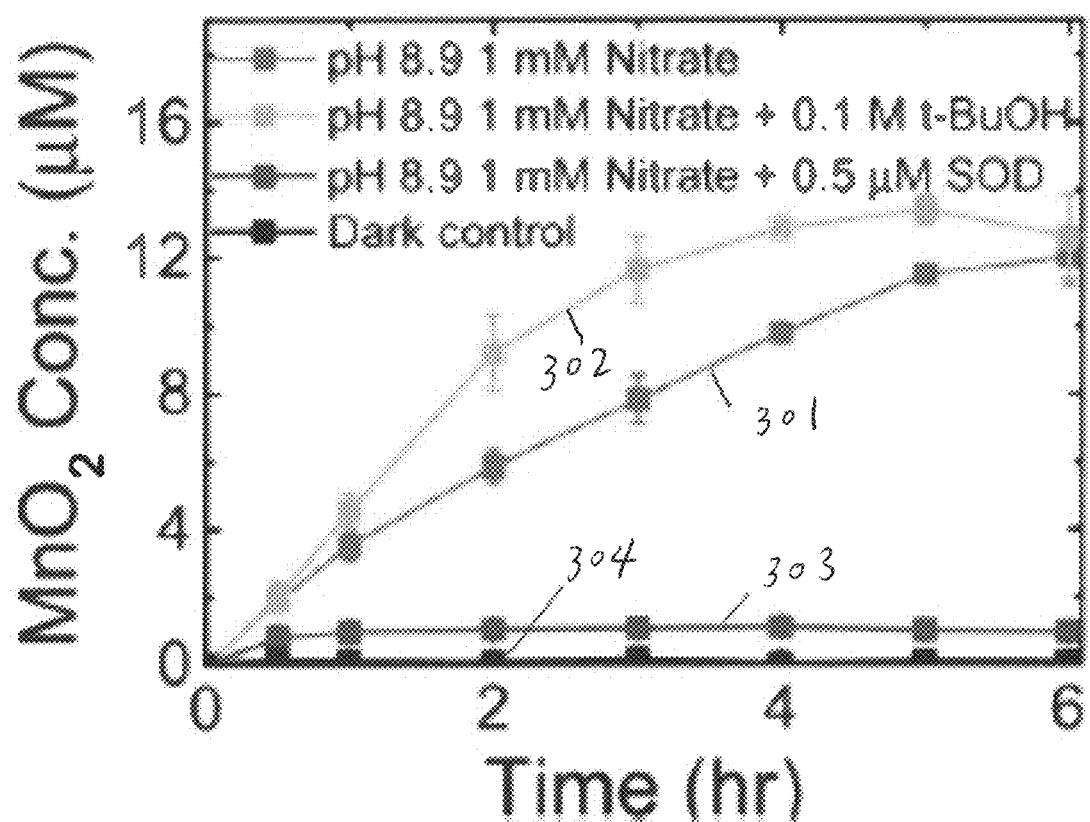
FIGS. 3A-B illustrate kinetics of photochemically-assisted Mn oxidation and electron transfer using in situ kinetics: (A) Formation of δ-MnO$_2$ nanosheets over time, and its suppression under the superoxide dismutase (SOD) conditions; and (B) Increase of nitrite concentration generated from nitrate photo-excitation.
Figure 3B:
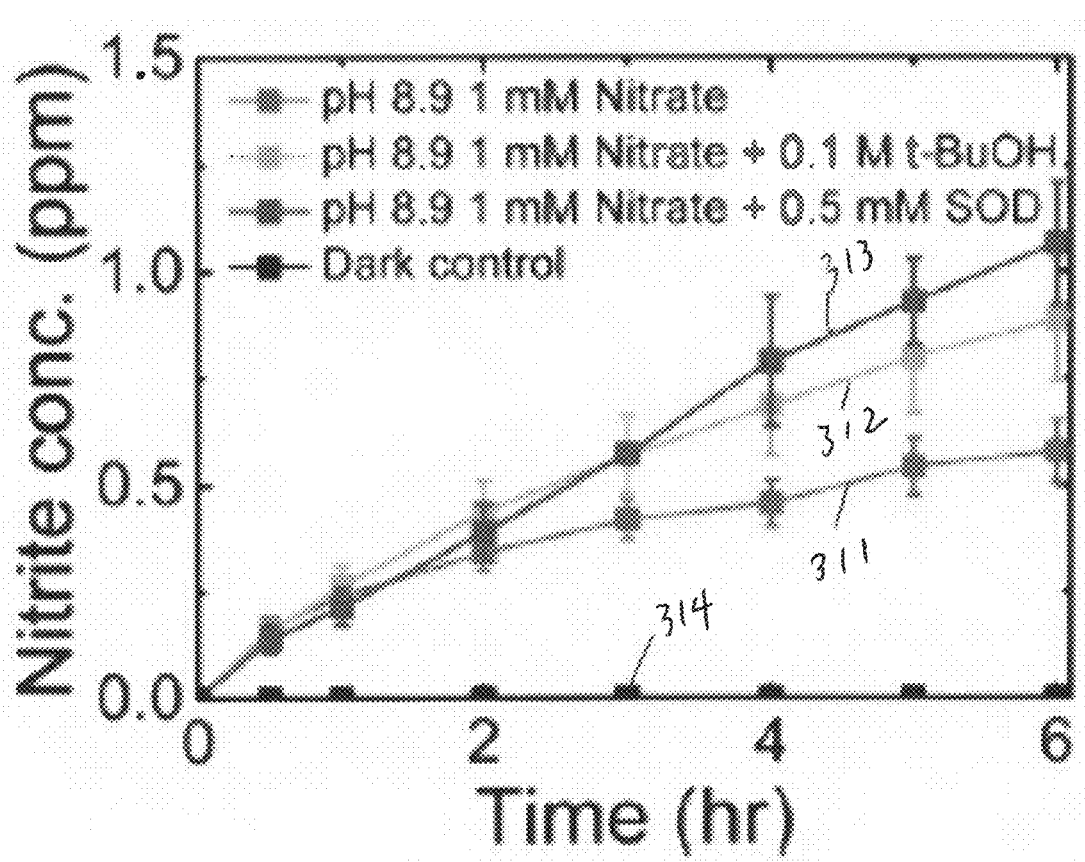

FIGS. 3A-B illustrate the kinetics of photochemically-assisted Mn oxidation and electron transfer using in situ kinetics: (A) Formation of δ-MnO₂ nanosheets over time, and its suppression under the superoxide dismutase (SOD) conditions; (B) Increase of nitrite concentration generated from nitrate photo-excitation. The error bars are obtained from triplicate tests. As shown in FIG. 3A, curve 301 represents MnO₂ concentration vs. time with 1 mM nitrate having a pH of 8.9. Curve 302 represents MnO₂ concentration vs. time with 1 mM nitrate having a pH of 8.9 plus 0.1 M t-BuOH. Curve 303 represents MnO₂ concentration vs. time with 1 mM nitrate having a pH of 8.9 plus 0.5 μM SOD. Curve 304 represents dark control.

As shown in FIG. 3B, curve 311 represents nitrate concentration vs. time with 1 mM nitrate having a pH of 8.9, curve 312 represents nitrate concentration vs. time with 1 mM nitrate having a pH of 8.9 plus 0.1 M t-BuOH, curve 313 represents nitrate concentration vs. time with 1 mM nitrate having a pH of 8.9 plus 0.5 μM SOD, and curve 314 represents dark control.

Kinetic studies with the ROS scavengers revealed that the Mn oxidation and the formation of δ-MnO₂ resulted from superoxides generated by the photo-excitation of nitrate (FIG. 3A). The formed δ-MnO₂ was quantified using the leucoberbelin blue (LBB) colorimetric method. FIG. 3A shows suppressed formation of δ-MnO₂, a result of the reaction with SOD, which indicates that superoxides are the biggest contributor to the photochemically-assisted formation of δ-MnO₂ in nitrate solution. When nitrate photodecomposition occurs, reactions between nitrogen oxide radicals (NO₂.) and (NO.) and nitrate generate nitrite (NO₂⁻). Then, photo-excited nitrite (NO₂⁻*) generates electrons, as shown in Eq. (1). The superoxide is created when dissolved oxygen captures the generated electron, as shown in Eq. (2).

$$NO_2^{-*} \rightarrow NO_2. + e_{aq}^- \qquad (1)$$

$$e_{aq}^- + O2 \rightarrow O2.^- \qquad (2)$$

A comparatively faster formation rate of δ-MnO₂ was observed with t-BuOH (FIG. 3A). The nitrite concentration increased even faster than that in the reaction solution without scavengers (FIG. 3B). The higher concentration of nitrite may generate more superoxides, and accelerate the formation of δ-MnO₂. Therefore, the hydroxyl radicals may not be responsible for the photochemically-assisted Mn oxidation. In addition, a higher nitrate concentration promoted much faster oxidation, when tested for complementary comparison. Mn oxide formed in 100 mM nitrate exhibited the properties of δ-MnO₂ nanosheets and formed about two times faster than that under 1 mM nitrate conditions. Because many elemental reactions occur simultaneously in photochemically-assisted Mn oxidation, the formation rate may not exactly reflect the nitrate increase.

By using pyrophosphate (PP), which strongly complexes with only Mn(III) in solution, the oxidation of $Mn^{2+}$ (aq) to Mn(IV) (s) occurs via two steps, each of which transfers one electron.

Figure 4A:
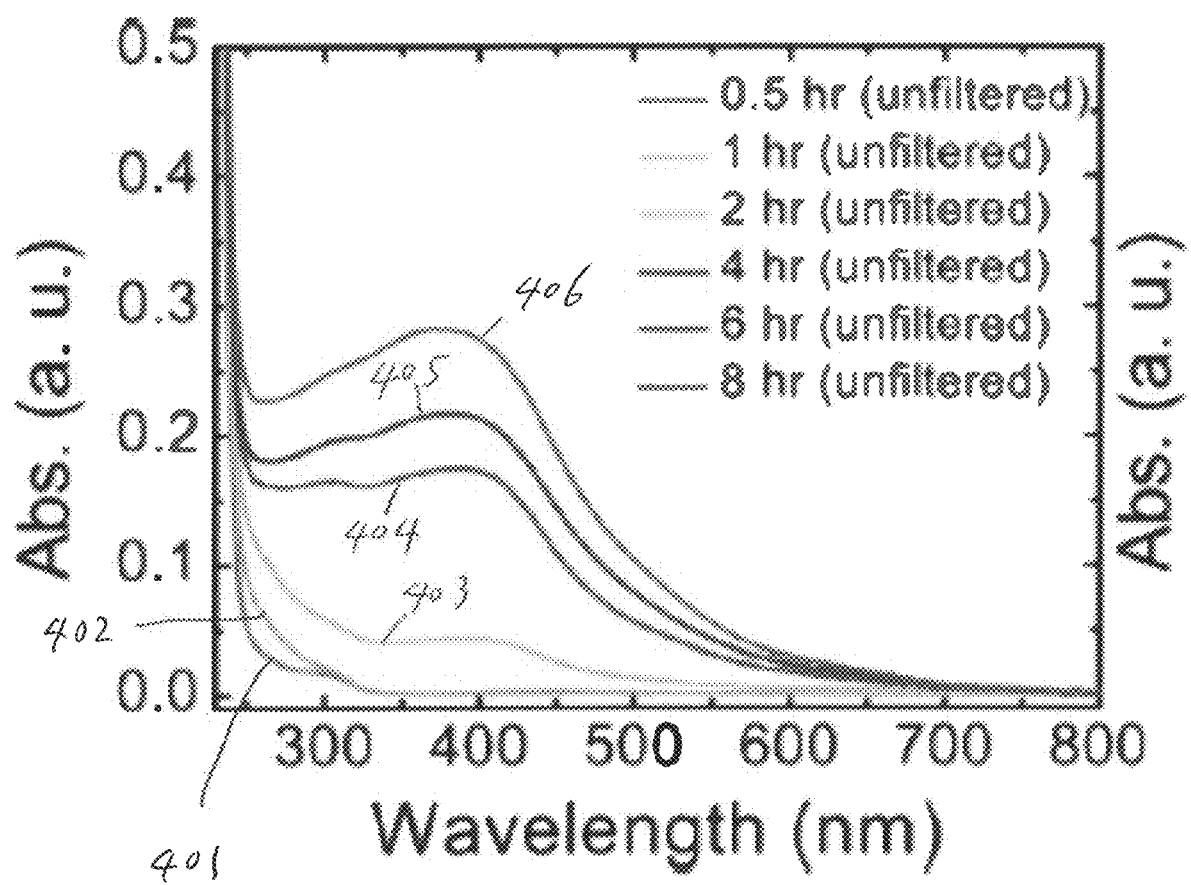
FIGS. 4A-B show confirmation of Mn(III) intermediate in Mn oxidation from Mn$^{2+}$ (aq) to Mn(IV) (s): (A) The absorbance peak of δ-MnO$_2$ at about 400 nm in samples overlapped the absorption peak of Mn(III)-pyrophosphate, which is at 258 nm; (B) After filtration using a 0.2 μm syringe filter to remove δ-MnO$_2$ nanosheets, the changes in the absorbance over time were observed.
Figure 4B:
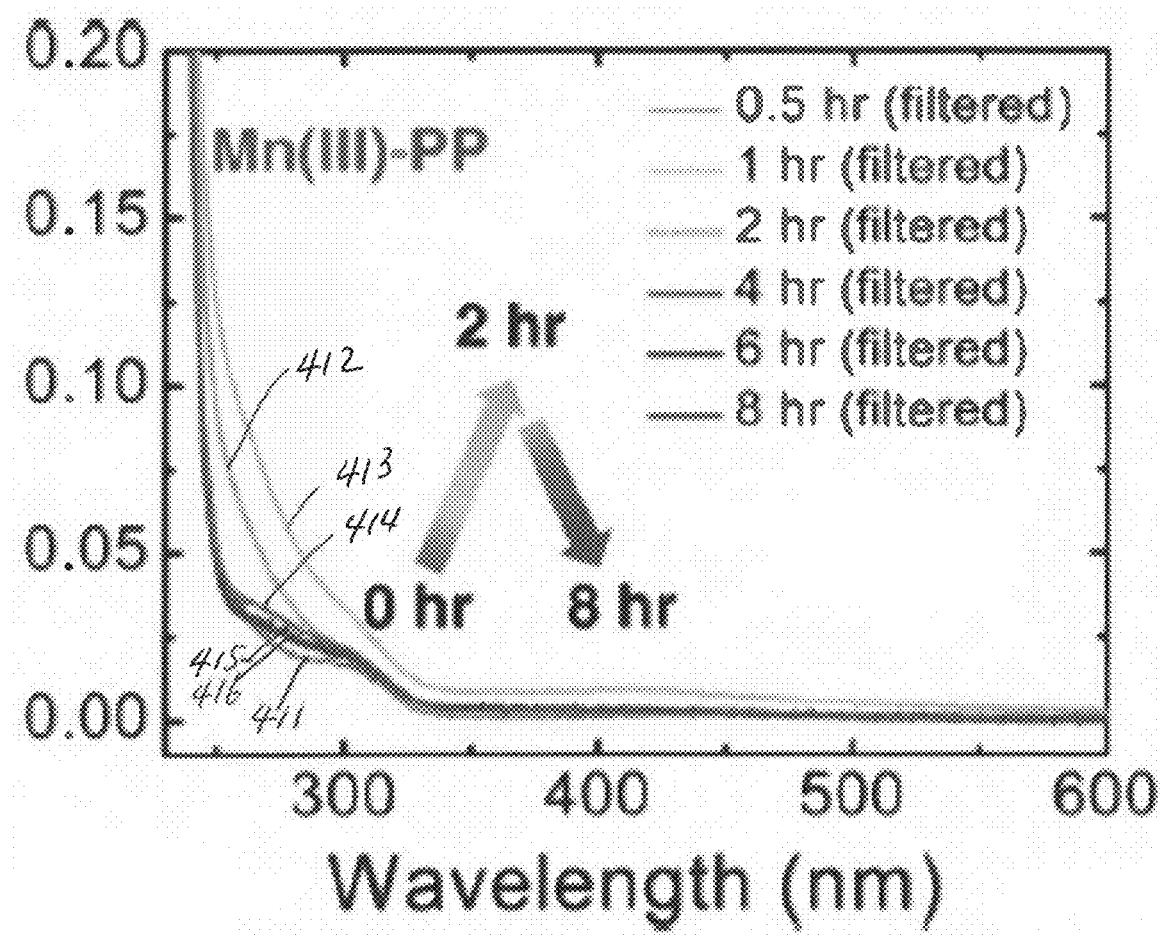

FIGS. 4A-B illustrate confirmation of a Mn(III) intermediate in Mn oxidation from $Mn^{2+}$ (aq) to Mn(IV) (s): (A) The absorbance peak of δ-MnO₂ at about 400 nm in samples overlapped the absorption peak of Mn(III)-pyrophosphate, which is at 258 nm; (B) After filtration using a 0.2 μm syringe filter to remove δ-MnO₂ nanosheets, changes in the absorbance over time were observed. As shown in FIG. 4A, curves 401-406 represent the absorption intensities of δ-MnO₂ after 0.5 hrs, 1 hrs, 2 hrs, 4 hrs, 6 hrs, and 8 hrs, respectively. As shown, an increase in absorbance was observed at 2 hours. After 2 hours, the absorbance decreased, and maintained a similar level. The absorbance at 258 nm for Mn(III)-pyrophosphate complexation indicates the existence of a Mn(III) intermediate in the reaction. The decrease in absorbance at 258 nm after 2 hrs is explained by the oxidation of Mn(III)-pyrophosphate, which becomes δ-MnO₂.

The occurrence and disappearance of Mn(III)-PP (FIG. 4B) indicated the oxidation of $Mn^{2+}$ (aq) to Mn(III), and of Mn(III) to Mn(IV). In the presence of PP, to clearly show that a soluble Mn(III)-PP complex is formed, δ-MnO₂ nanosheets were filtered using a 0.2 μm syringe filter before the Mn(III)-PP complexation in solution was detected by UV-Vis spectrometry (FIG. 4B). The absorption intensities of Mn(III)-PP increased over the first 2 hours (h), then decreased (FIG. 4B). Also, a very large increase in δ-MnO₂ formation occurred between 2 h and 4 h (FIG. 4A). The concurrent increase of δ-MnO₂ and decrease in Mn(III)-PP concentration suggest that when the oxidation of Mn(III)-PP occurs, it promotes the formation of δ-MnO₂. This finding indicates that Mn(III) can occur as an intermediate state between $Mn^{2+}$ (aq) and Mn(IV) (S) during the light exposure, and quickly transform to Mn(IV) (S). Thus, photochemically-assisted $Mn^{2+}$ (aq) oxidation in nitrate solution may occur via two steps, each of which transfers one electron in the reaction between manganese and superoxide.

After 6 hrs of reaction, about 13 μM of δ-MnO₂ had been produced, based on the LBB colorimetric method, as illustrated in FIG. 3A. It is clear that the abiotic formation rate of δ-MnO₂ is comparable to the formation rate of δ-MnO₂ in microbial processes reported in previous studies. To date, these microbially mediated processes have been considered as the dominant driver of fast Mn oxidation in natural aqueous systems. For example, recent works using Roseobacter-like bacteria and α-proteobacteria showed that the bacteria oxidized about 0.6 μM h⁻¹ of $Mn^{2+}$ (aq). The concentration of δ-MnO₂ formed under natural sunlight in the experiment was about four times lower than that formed under Xe lamp illumination, but surprisingly the concentration was still comparable to that achieved by bacterial oxidation. Thus, the disclosure presents a pathway for the abiotic formation of Mn(IV) oxide within hours.

In some embodiments, the abiotic formation of Mn(IV) oxide takes equal to or less than 10 hrs. In some embodiments, the abiotic formation of Mn(IV) oxide takes equal to or less than 8 hrs. In some embodiments, the abiotic formation of Mn(IV) oxide takes equal to or less than 6 hrs. In some embodiments, the abiotic formation of Mn(IV) oxide takes equal to or less than 4 hrs. In some embodiments, the abiotic formation of Mn(IV) oxide takes equal to or less than 2 hrs. In some embodiments, the abiotic formation of Mn(IV) oxide takes equal to or less than 1 hrs.

In some embodiments, the abiotic formation of Mn(IV) oxide takes equal to or greater than 0.5 hrs. In some embodiments, the abiotic formation of Mn(IV) oxide takes equal to or greater than 1 hrs. In some embodiments, the abiotic formation of Mn(IV) oxide takes equal to or greater than 2 hrs. In some embodiments, the abiotic formation of Mn(IV) oxide takes equal to or greater than 3 hrs. In some embodiments, the abiotic formation of Mn(IV) oxide takes equal to or greater than 4 hrs. In some embodiments, the abiotic formation of Mn(IV) oxide takes equal to or greater than 6 hrs. In some embodiments, the abiotic formation of Mn(IV) oxide takes equal to or greater than 8 hrs.

In some embodiments, the concentration of the nitrate solution is at least 0.1 mM. In some embodiments, the concentration of the nitrate solution is at least 0.2 mM. In some embodiments, the concentration of the nitrate solution is at least 0.3 mM. In some embodiments, the concentration of the nitrate solution is at least 0.4 mM. In some embodiments, the concentration of the nitrate solution is at least 0.5 mM. In some embodiments, the concentration of the nitrate solution is at least 0.6 mM. In some embodiments, the concentration of the nitrate solution is at least 0.7 mM. In some embodiments, the concentration of the nitrate solution is at least 0.8 mM. In some embodiments, the concentration of the nitrate solution is at least 0.9 mM. In some embodiments, the concentration of the nitrate solution is at least 1 mM. In some embodiments, the concentration of the nitrate solution is at least 2 mM. In some embodiments, the concentration of the nitrate solution is at least 3 mM. In some embodiments, the concentration of the nitrate solution is at least 5 mM. In some embodiments, the concentration of the nitrate solution is at least 10 mM. In some embodiments, the concentration of the nitrate solution is at least 50 mM. In some embodiments, the concentration of the nitrate solution is at least 100 mM.

(ii) Atmospheric Systems

The findings of photochemically-assisted fast manganese oxidation in nitrate solution provide a paradigm for understanding the environmental cycle of manganese oxidation not only in aqueous systems, but also in atmospheric systems. Aqueous particles and drops, such as haze and clouds, contain about 0.01-100 μM of $Mn^{2+}$ (aq), and there are atmospheric $NO_x$ species in concentrations between 10 and 1000 ppbv in urban and suburban areas receiving UV light. Thus, similar photochemically-assisted reactions can occur in the atmosphere and affect cloud condensation nuclei formation, albedo, and aerosol processes. The same approach can be utilized as an environmentally friendly way to synthesize $\delta$-$MnO_2$ nanomaterials, which have promising applications in super-capacitors and Li-ion batteries. Further, as a possible self-healing pathway for the reduced $\delta$-$MnO_2$ in photochemical water-oxidation utilizes the most abundant renewable energy source, sunlight.

II. Photochemically-Assisted Synthesis of Birnessite Nanosheets and their Structural Alternation in the Presence of Pyrophosphate Mn(III)-PP is of emerging interest in understanding Mn redox cycling and phosphorus cycling in catalysis and environmental systems. The disclosure provides further oxidation of Mn(III)-PP and consequent formation of a $MnO_2$ solid phase. Using photochemically-assisted fast oxidation of $Mn^{2+}$ (aq) by a reaction with superoxide, generated from nitrate photolysis, PP affects formation of disordered $\delta$-$MnO_2$ nanosheets and changes in their stacking and structures. With increasing PP concentrations from 0.3 to 2 mM, $\delta$-$MnO_2$ nanosheets showed better stacking (thicker) layers and an alteration from hexagonal to orthogonal structure (more Mn(III) in layers). It was discovered that the amount of Mn(III)-PP complex and the formation rate of $\delta$-$MnO_2$ nanosheets under the different PP concentrations affected both their layer structures and stacking behaviors. These findings open a possibility of using photochemically-assisted green chemistry to control the properties of disordered $\delta$-$MnO_2$ birnessite nanosheets for use in more effective catalytic reactions, such as water oxidation, and suggest the importance of Mn(III)-PP complexes for the formation of $\delta$-$MnO_2$ nanosheets in nature.

Figure 5:
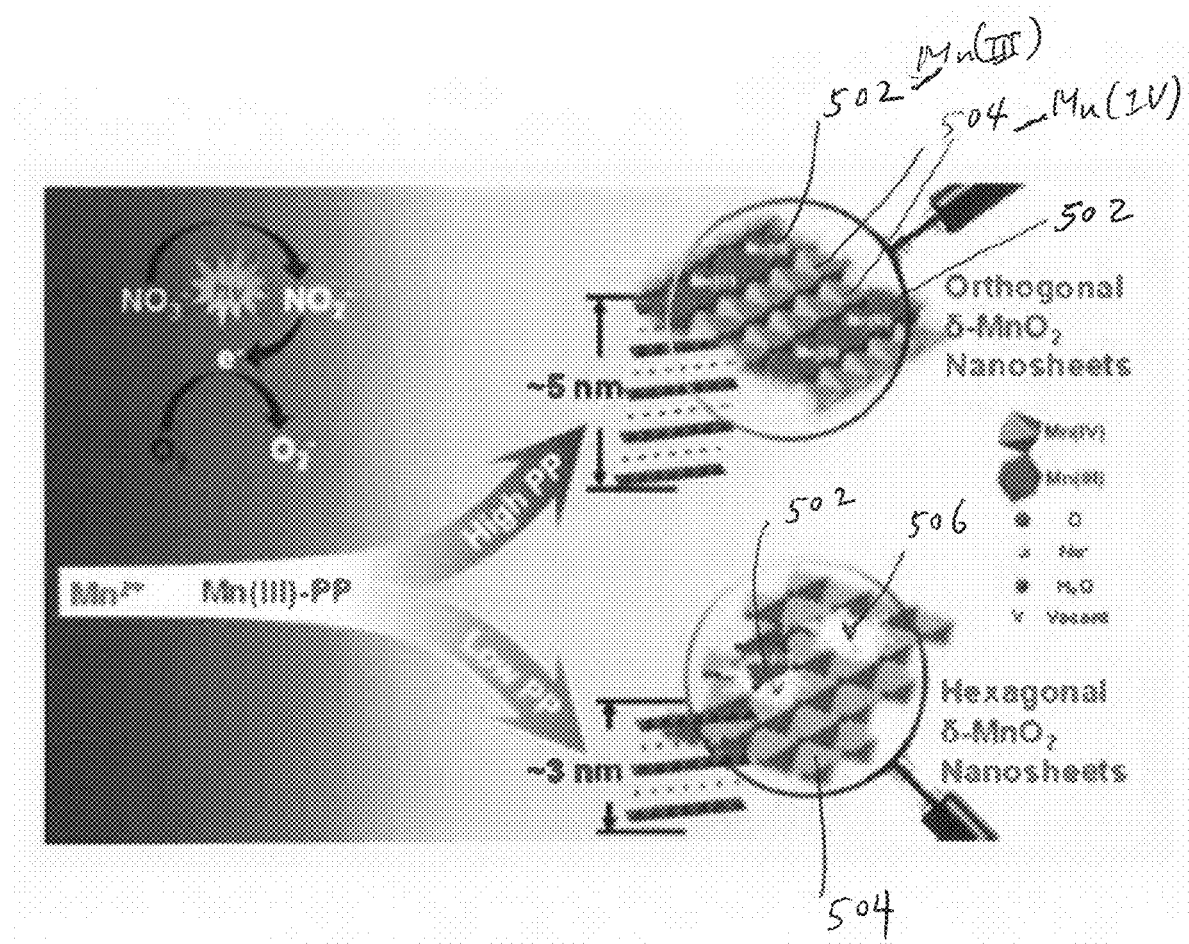
FIG. 5 shows sketches of orthogonal δ-MnO$_2$ nanosheets and hexagonal δ-MnO$_2$ nanosheets in an embodiment.

FIG. 5 shows sketches of orthogonal $\delta$-$MnO_2$ nanosheets and hexagonal $\delta$-$MnO_2$ nanosheets in an embodiment. As shown in FIG. 5, when the PP concentration was high, the resulting orthogonal $\delta$-$MnO_2$ nanosheets were about 5 nm thick. Mn(III) 502 occurred in the interlayers between Mn(IV) nanosheets 504. Turning to the lower portion of the figure, when the PP concentration was low, the resulting hexagonal $\delta$-$MnO_2$ nanosheets were about 3 nm thick. Mn(III) 502 occurred in the vacancy 506 in the Mn(IV) nanosheets 504.

Also, when nitrate photodecomposition occurs, reactions generate $NO_2^-$. As shown in FIG. 5, $NO_3^-$ can change to $NO_2^-$ and generate an electron $e^-$. Superoxide ($O_2^-$) is created when oxygen ($O_2$) captures the generated electron $e^-$.

Manganese (Mn) is one of the most abundant transition metals in the Earth's crust. Mn exists in three oxidation states, 2+, 3+, and 4+, in natural aqueous systems, and its rich redox chemistry controls the fate of micronutrients and heavy metals in environmental systems. Also, the redox capability of Mn(III/IV) oxides have been used as catalysts in engineered systems, such as water oxidation catalysis. Among the oxidation states, Mn(II) commonly exists as an aqueous form of Mn complexes if a system is not super-saturated with $MnCO_3$ (s) and $Mn(OH)_2$ (s), while Mn(III) and Mn(IV) mostly occur as mineral forms. Although Mn(III) exists mainly as Mn (hydr)oxide particulates in environmental systems, soluble Mn(III) also occurs via complexation with organic or inorganic ligands, such as siderophore desferrioxamine B (DFOB) and pyrophosphate (PP). The soluble Mn(III) complex is the major aqueous Mn species in pore water and suboxic water. Both the abundance of soluble Mn(III) and its variable redox reactivity under varied ligand complexes illuminate the importance of understanding soluble Mn(III) in environmental and engineered systems.

The disclosure provides the role of PP in the oxidation of soluble Mn(III) and the consequent formation of Mn(IV) oxide, specifically disordered birnessite ($\delta$-$MnO_2$) nanosheets, which are one of the most abundant Mn (hydr) oxide forms in nature.

Disordered (turbostratic) $\delta$-$MnO_2$ is often of interest for its redox reactions and 2D layer structure in environmental systems, and also in engineering applications, such as photochemical water oxidation and Li-ion batteries. Inspired by the $Mn_4CaO_x$ cluster of photosystem II, photochemical water oxidation tests using disordered $\delta$-$MnO_2$ nanosheets showed a high catalytic reactivity. Also, Mn(III) was used as a precursor in the $\delta$-$MnO_2$ nanosheets for water oxidation. On the basis of their structures, such as vacant sites and interlayer Mn(III) or Mn(II), $\delta$-$MnO_2$ nanosheets can have variable oxidation states of Mn between about 3.5+ and about 4+. The mixed valences and structural diversities of disordered $\delta$-$MnO_2$ nanosheets are useful in catalysis and environmental systems.

The oxidation of $Mn^{2+}$ (aq) to Mn(IV) and formation of disordered $\delta$-$MnO_2$ have been explained by biotic processes, such as those involving bacteria and fungi in nature. The early portion of the disclosure describes the photochemically-assisted fast abiotic oxidation of $Mn^{2+}$ (aq) to Mn(IV) in a nitrate solution, and the consequent formation of disordered $\delta$-$MnO_2$ nano-sheets within a few hours. The following portion of the disclosure describes how disordered $\delta$-$MnO_2$ nanosheets have variable oxidation states in environmental systems.

Starting from the photochemically-assisted formation of disordered $\delta$-$MnO_2$ nanosheets, the disclosure provides the roles of PP concentrations in changing stacking behavior and the amount of Mn(III). With increasing PP concentrations between 0.3 and 2 mM, better (thicker) stacking behavior of disordered δ-MnO$_2$ nanosheets was found, and their structural alteration from hexagonal to orthogonal δ-MnO$_2$ (more Mn(III) and less vacancy in layers than those in hexagonal δ-MnO$_2$) was discovered. The disclosure shows how PP can affect the formation of disordered δ-MnO$_2$ nanosheets, and the crucial role of a photochemically-assisted abiotic process for Mn oxidation and consequent formation of disordered δ-MnO$_2$ in nitrate solution. The findings illuminate an undiscovered mechanism for the environmental occurrence of δ-MnO$_2$, the photochemical oxidation and formation of soluble Mn(III) to Mn(IV) oxide in environmental systems. In environmental systems, high concentrations of PP can occur as a result of anthropogenic activities. The disclosure provides how the inorganic ligand (i.e., PP) in environmental systems can affect the oxidation kinetics and formation behavior of the most abundant Mn(IV) oxide, δ-MnO$_2$.

This disclosure also provides a hint as to how very diverse birnessite structures occur in nature, such that the effect of human activities on environmental systems may be better assessed and attention may be turned to unexplored nitrogen and phosphorus cycles in the environment. In addition, these findings provide important insights into photochemically-assisted green chemistry to control the properties of disordered birnessite nanosheets, and also provide useful synthetic principles for more effective catalytic materials, such as for water oxidation.

(i) Solution Preparation for Experiments

All samples were prepared with 100 μM Mn(NO$_3$)$_2$ (Alfa Aesar) at the end of a 6 h reaction at room temperature. PP concentrations of 0.3, 0.5, 1, and 2 mM, were prepared using Na$_4$P$_2$O$_7$, referred to as PP (Sigma-Aldrich). Initial pHs at 0.3, 0.5, 1, and 2 mM were 9.62±0.13, 9.84±0.23, 9.88±0.25, and 9.95±0.11, respectively. For a nitrate source to oxidize Mn$^{2+}$ (aq) to Mn(IV) via photochemical reaction, 1 mM NaNO$_3$ was added. This NaNO$_3$ concentration is environmentally relevant concentration, which can refer from the U.S. Environmental Protection Agency's drinking water limit, 0.714 mM (10 ppm(NO$_3^-$—N)).

(ii) Photo-Oxidation Analysis

The experiment was conducted with a 450 W Xe-arc lamp (Newport), which has about 4.5 times stronger intensity than outdoor natural sunlight. The light was initially passed through a 10 cm IR water filter. The solutions were reacted in a cylindrical reactor having a vertical quartz window facing the light source. The concentrations of produced disordered δ-MnO$_2$ were measured by the colorimetric method using 0.004% (w/v) leucoberbelin blue (Sigma-Aldrich). (λ=625 nm, ε=180000 M$^{-1}$). Leucoberbelin blue (LBB) reduces Mn(III) or Mn(IV) to Mn$^{2+}$ (aq), and turns a blue color. The calibration curve was obtained by using KMnO$_4$. The concentration of soluble Mn(III)-PP complex was measured using UV-vis (ε=6711 M$^{-1}$ at λ=258 nm, Cary 50 UV-vis spectrophotometer). Because LBB is oxidized by Mn(III) and Mn(IV), the data for particulate quantity is shown as Mn(IV)O$_2$ equivalents because of the difficulty in differentiating the portion of Mn(III) from mixed valence Mn.

(iii) Solid-Phase Characterization

After 6 hours of reaction, the disordered δ-MnO$_2$ nanosheets synthesized under various PP conditions were centrifuged four times at 12 000 rpm for 15 min. To remove all aqueous species, the samples were sequentially washed and centrifuged four times in DI water. High-resolution X-ray diffraction (HRXRD, Bruker D8 Advance X-ray diffractometer with Cu Kα radiation (λ=1.5418 Å) provided the phase of Mn (hydr)oxide and information about stacked layers of disordered δ-MnO$_2$ nanosheets. X-ray photoelectron spectroscopy (XPS, PHI 5000 VersaProbe II, Ulvac-PHI with monochromatic Al Kα radiation (1486.6 eV)) was used to compare the ratio of Mn(III) to Mn(IV) for the synthesized δ-MnO$_2$ under the various PP conditions. The C is peak (284.8 eV) was taken as the energy reference. The Mn 2p$_{3/2}$ spin orbit with Mn(III) (641.8 eV) and Mn(IV) (642.2 eV) were fitted. A scanning electron microscope (SEM, FEI Nova NanoSEM 2300) visualized the formed Mn oxides at a 10 kV accelerating voltage. Particles were coated with Au to increase their conductivity. The working distance between the bottom of the objective lends and the sample was 5-6 mm.

Small-angle X-ray scattering (SAXS) and the X-ray pair distribution function (PDF) were measured on beamlines 12 ID-B and 11ID-B, respectively, at the Advanced Photon Source at Argonne National Laboratory, IL. A focused X-ray beam with an energy of 14 keV was exposed through samples sealed between Kapton tape layers. A 2 m sample-to-detector distance (0.0085 Å$^{-1}$<q<0.400 Å$^{-1}$) was used. The beam exposure time was set to 10 s for each measurement. A 2D background image of Kapton tape scattering was measured without particles for background subtraction. The samples were loaded on the beamline stage, SAXS images were obtained. The 1D intensities (I) averaged from 2D sample scattering data were subtracted from the averaged background intensities, then plotted as a function of the scattering vector, q, and analyzed by MATLAB based software developed at beamline 12 ID-B. X-ray PDF measurements were conducted with an energy of 58.290 keV (λ=0.2127 Å). The same samples used in the SAXS measurements were exposed for 5 s, repeated 36 times for each sample. The Kapton background data was also obtained with the same beam exposure time for background subtraction. 1D intensities as a function of q were obtained by converting the 2D images using Fit2D. PDFgetX2 was used to convert the 1D intensity to pair distribution function (G(r)).

The ratios of Na to Mn were obtained using inductively coupled plasma mass spectroscopy (ICP-MS, Agilent ICP-MS 7500). The samples were sequentially centrifuged and washed 6 times to obtain only particles, not any cations or anions in the solutions. The washed particles were digested in 1 mM ascorbic acid (Sigma-Aldrich). The digested samples were measured using ICP-MS. Water amounts were measured by a thermo gravimetric analyzer (TGA, TA Instruments Q5000 IR). The loss of water below 200° C. was measured.

(iv) Results

Figure 6A:
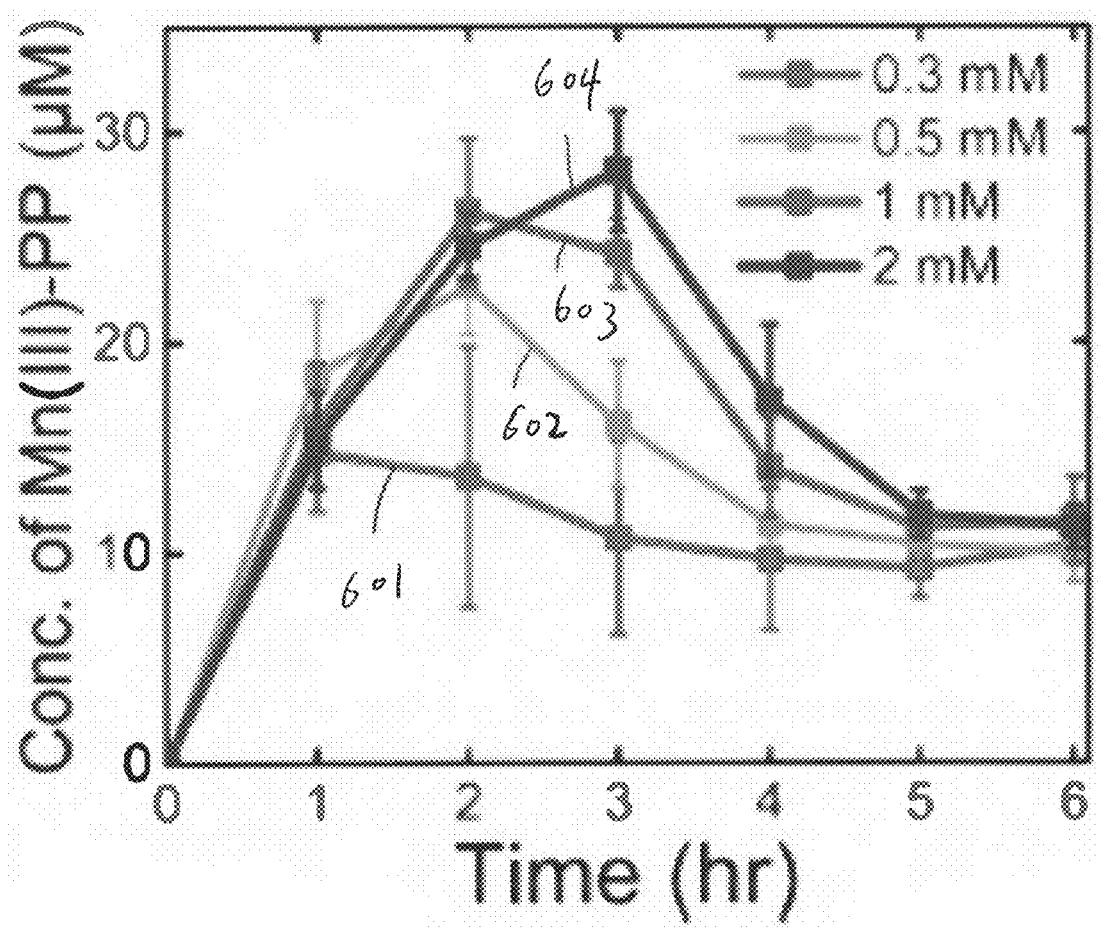
FIGS. 6A-B illustrate photochemically-assisted oxidation of Mn$^{2+}$ to Mn(III) and further to Mn(IV) under various pyrophosphate (PP) concentrations: (A) soluble Mn(III)-PP and (B) particulate Mn(IV) oxide.
Figure 6B:
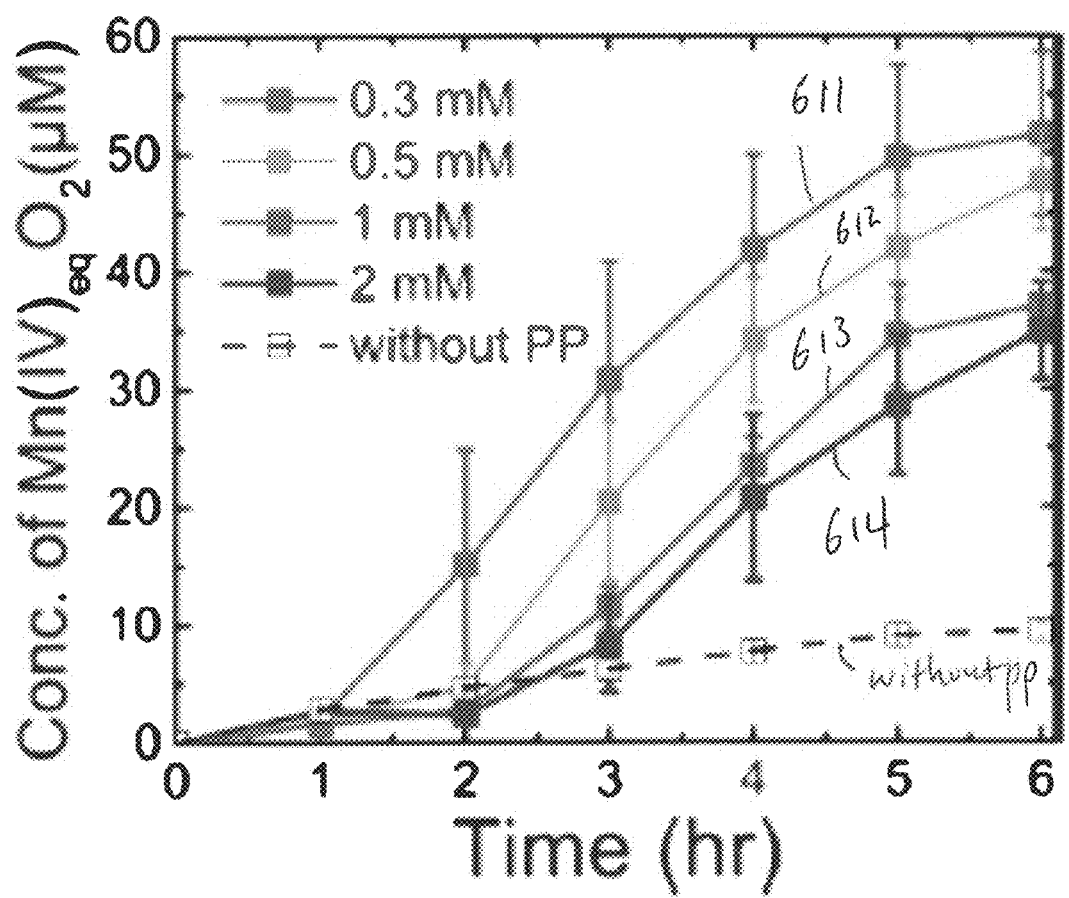

Pyrophosphate (PP) affects the occurrence of soluble Mn(III)-PP complex and MnO$_2$ particulates in photochemically-assisted oxidation of Mn$^{2+}$ (aq). Further analyses revealed that the particles are disordered δ-MnO$_2$ nanosheets. FIGS. 6A-B illustrate photochemically-assisted oxidation of Mn$^{2+}$ to Mn(III) and further to Mn(IV) under various PP concentrations, (A) soluble Mn(III)-PP and (B) particulate Mn(IV) oxide. The higher the PP concentration, the higher the maximum concentration of Mn(III)-PP and the lower the formation rate of δ-Mn(IV)O$_2$ nanosheets. The onset of the decrease of Mn(III)-PP and the formation of δ-MnO$_2$ nanosheets occur concurrently, which indicates the further oxidation of soluble Mn(III)-PP to δ-MnO$_2$ nanosheets. The data for particulate Mn oxide are shown as Mn(IV) oxide equivalents because of the difficulty in differentiating the portion of Mn(III) from mixed valence Mn. Curves 601-604 represent Mn(III)-PP concentration in μM versus time in hrs at PP concentrations of 0.3 mM, 0.5 mM, 1 mM, and 2 mM, respectively. Curves 611-614 represent Mn(IV) concentration in µM versus time in hrs at PP concentrations of 0.3 mM, 0.5 mM, 1 mM, and 2 mM, respectively.

FIG. 6A shows that an increase of PP concentration promotes an increase in the maximum concentration of Mn(III)-PP and lengthens the reaction time needed to reach the maximum concentration. After the concentration of Mn(III)-PP reached the maximum at each PP concentration, subsequently the concentration of δ-MnO$_2$ increased. Also, the onset time of the formation of δ-MnO$_2$ nanosheets occurred later with an increase of PP concentration. At 0.3 mM PP, the concentration of Mn(III)-PP became lower after 1 h, and the fastest formation of δ-MnO$_2$ nanosheets was observed among all the PP conditions.

At 1 and 2 mM PP, the concentration of Mn(III)-PP increased by about 1.5 times higher than that an 0.3 mM PP in 2-3 hrs, and δ-MnO$_2$ was formed after 3 hrs from the onset of the reaction. The disclosure demonstrates that superoxide, generated from the photolysis of nitrate, oxidizes Mn$^{2+}$ (aq) to δ-Mn(IV)O$_2$ via an Mn(III) intermediate. When Mn$^{2+}$ (aq) is oxidized to Mn(III) in the presence of PP, Mn(III)-PP complex occurs. Because Mn(III)-PP is a highly stable complex, it does not dissociate to Mn(III) and PP by itself within several hours. Therefore, the decrease of Mn(III)-PP over the peak concentration indicates further photochemically-assisted oxidation of Mn(III)-PP to Mn(IV) by superoxide, which is generated from the nitrate photolysis. During the formation and transformation of the soluble Mn(III)-PP in oxidation, the complexation between Mn(III)-PP was consistent, without any change resulting from deprotonation and protonation of PP. If a change had occurred, it would be marked by a shift in UV-vis absorbance at around 450 nm.

In this reaction system, the PP behaves as a catalyst to enhance the oxidation of Mn$^{2+}$(aq) to Mn(III) and further to Mn(IV). Compared to the oxidation of Mn$^{2+}$(aq) to Mn(IV) without PP, about 3-5 times faster formation occurred, because complexation with PP stabilizes the oxidized Mn(III) occurring from the oxidation of Mn$^{2+}$(aq) with superoxide (FIG. 6B), which is the kinetically-limited reaction. Therefore, the stabilized Mn(III)-PP restrains the reverse reaction to Mn$^{2+}$(aq). Also, the slower formation of δ-MnO$_2$ nanosheets with the increase of PP concentration in FIG. 6B indicates that the role of PP is to enhance the stabilization of soluble Mn(III) during the oxidation of Mn$^{2+}$(aq) to Mn(IV).

Figure 7:
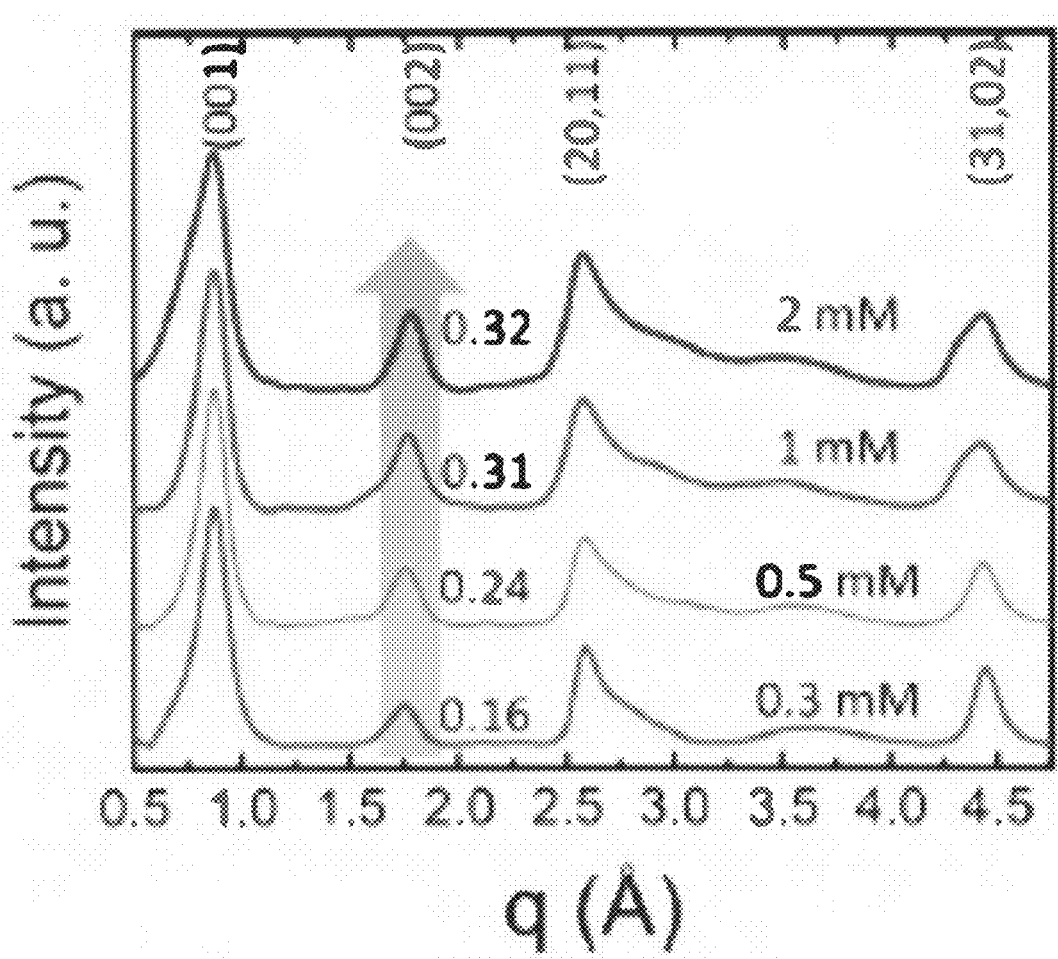
FIG. 7 illustrate synchrotron-based wide-angle X-ray scattering data showing enhanced amplitudes of basal reflections of (001) and (002) with increasing PP concentrations.

The presence of PP and various PP concentrations affected the final disordered δ-MnO$_2$ nanosheets and their structural changes. Under all PP conditions, photochemically-assisted oxidation of Mn$^{2+}$ (aq) in nitrate solution showed fast oxidation to Mn(IV) and formation of disordered δ-MnO$_2$ nanosheets (FIG. 7). While all the PP conditions yielded δ-MnO$_2$ nanosheet structures, an increase of PP resulted in better stacking behavior of the δ-MnO$_2$ nanosheets. FIG. 7 shows synchrotron-based wide-angle X-ray scattering (WAXS) data showing enhanced amplitudes of basal reflections of (001) and (002) with increasing PP concentrations. The absence or weakness of basal reflections indicates poorer stacking layers with a relatively smaller number of randomly stacked sheets. The hk bands of (20, 11) and (31, 02) are also shown. The broad hk bands come from disordered (turbostratic) nanosheets. For all PP conditions, the most discernible feature in WAXS is the (001) and (002) reflections. The poorer reflections of the (001) and (002) basal planes indicate more poorly stacked layers. Specifically, the increased reflection of the (002) basal plane from 0.3 to 1 and 2 mM PP was observed.

Size analyses also showed thicker and larger widths of disordered δ-MnO$_2$ nanosheets in 1 and 2 mM PP than that in 0.3 mM PP. Using small-angle X-ray scattering (SAXS) analyses, the thickness of δ-MnO$_2$ nanosheets under various PP concentrations was measured, with the results shown in FIG. 8A. Synchrotron-based SAXS measurement has been widely used not only to measure nanoparticles, but also to measure the thickness of nanosheets of birnessite and other materials as Well. Specifically, the synchrotron-based SAXS provides more statistically-improved data than electron microscopies because of its large X-ray scattering dimension (20 µm×200 µm). The lateral dimensions of δ-MnO$_2$ nanosheets (>>100 nm) are much larger than the measurement window of SAXS, so the dimensions obtained from SAXS result solely from the thicknesses of δ-MnO$_2$ nanosheets. The SAXS measurement shows that the bent regime of q (scattering vector) moves to the left side (lower q), which indicates an increase of thickness in nanosheets as the PP concentration increases from 0.3 to 1 and 2 mM. The particle thicknesses are 2.8, 3.4, 5.3, and 4.7 nm, at 0.3, 0.5, 1, and 2 mM PP, respectively. The distribution of layer thicknesses from transmission electron microscopy also showed a consistent trend of thickness increasing with an increase of PP, as also observed in the SAXS fitting results.

Figure 8A:
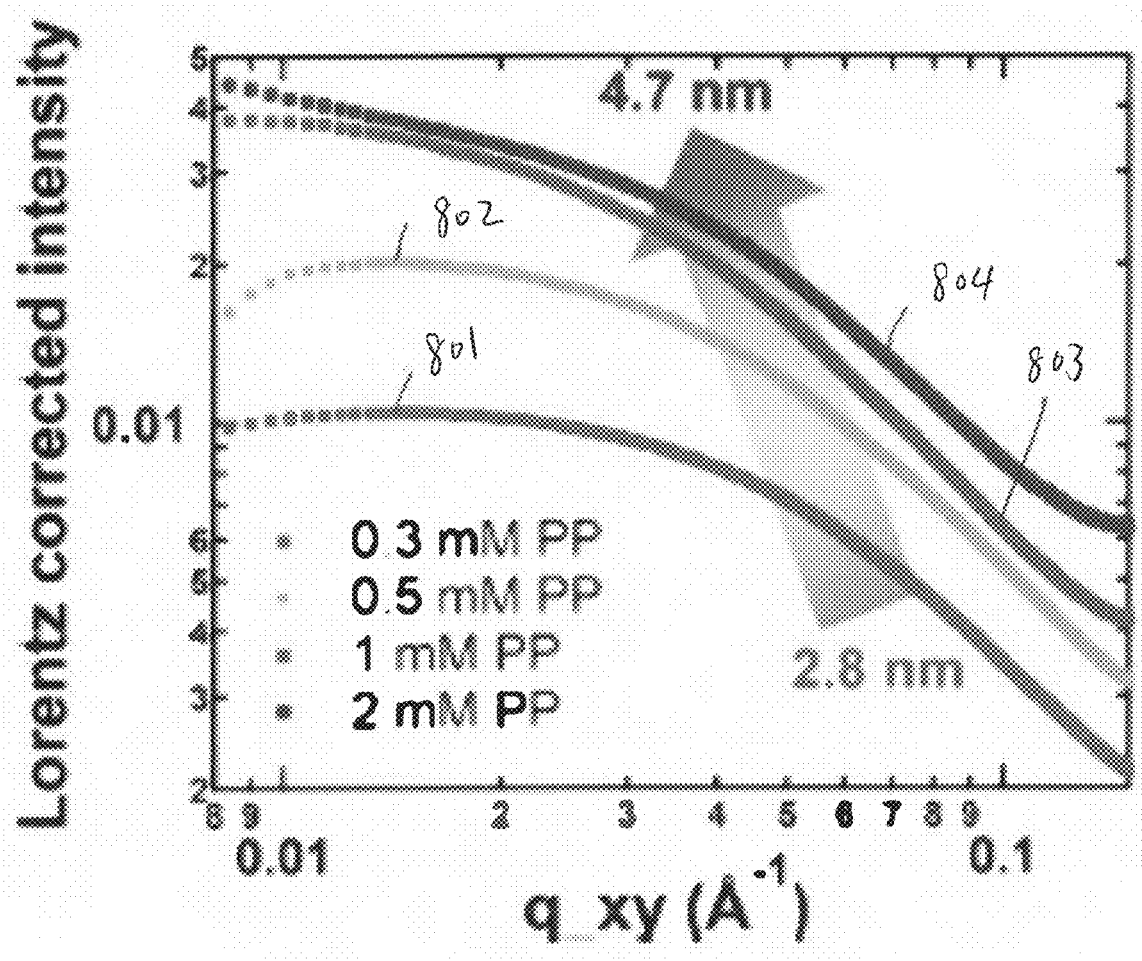
FIGS. 8A-B illustrate (A) Lorentz corrected intensity (I×q$^2$) vs thickness analyzed using Small-angle X-ray scattering (SAXS); (B) A red-shift occurred with increasing PP concentrations.
Figure 8B:
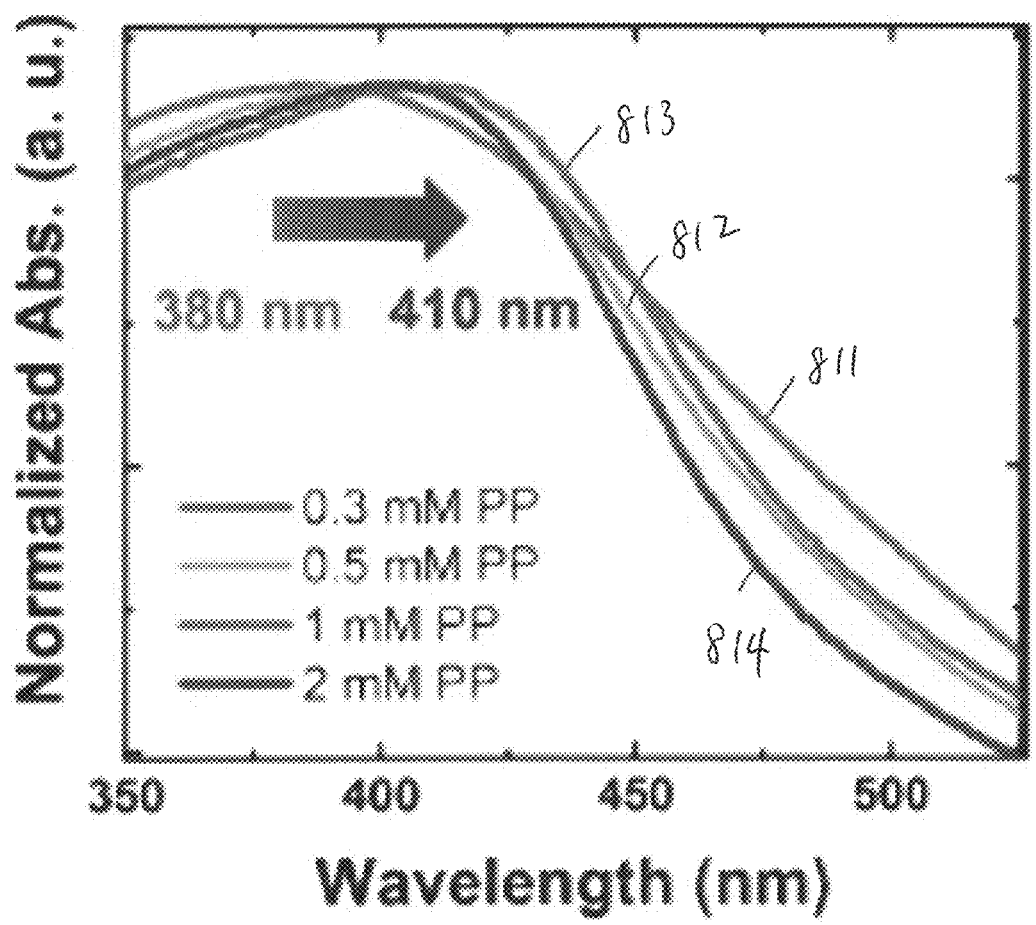
Figures 9A, 9B, 9C, 9D:
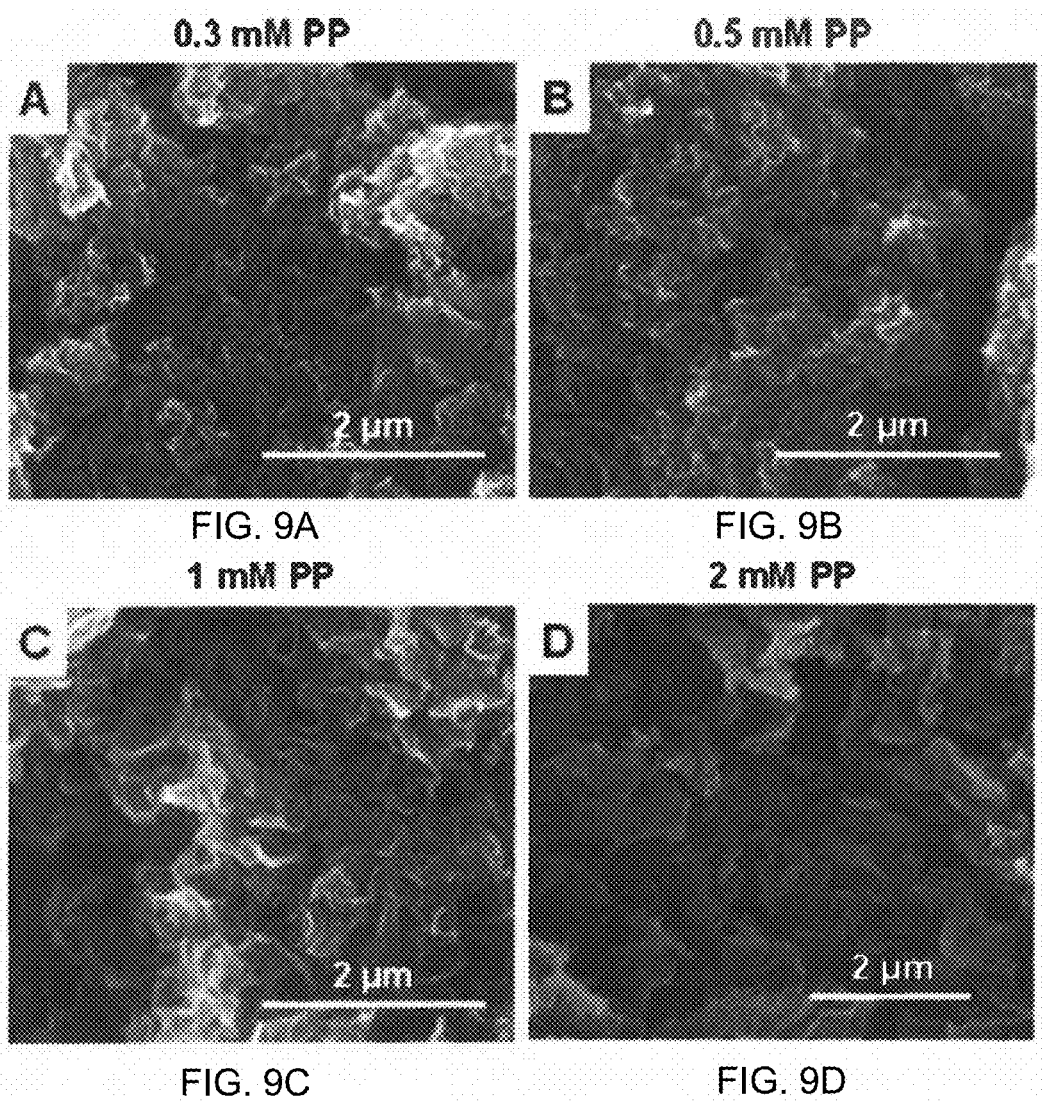
FIGS. 9A-D illustrate layer morphologies of the δ-MnO$_2$ nanosheets under various PP concentrations: (A) 0.3 mM PP, (B) 0.5 mM PP, (C) 1 mM PP, and (D) 2 mM PP.

FIGS. 8A-B illustrate (A) Lorentz corrected intensity (I×q$^2$) vs thickness analyzed using SAXS, and (B) A red-shift occurred with increasing PP concentrations. Curves 801-804 represent Lorentz corrected intensity at PP concentrations of 0.3 mM, 0.5 mM, 1 mM, and 2 mM, respectively. Curves 811-814 represent normalized absorption versus wavelength in nm at PP concentrations of 0.3 mM, 0.5 mM, 1 mM, and 2 mM, respectively.

The red-shift and thicker layers at the higher PP concentrations indicate that disordered δ-MnO$_2$ nanosheets showed quantum confinement.

The particles, which have thicker sheets, also have larger widths. The particle morphologies were observed in SEM images. FIGS. 9A-D show layer morphologies of the δ-MnO$_2$ nanosheets under various PP concentrations: (A) 0.3 mM PP, (B) 0.5 mM PP, (C) 1 mM PP, and (D) 2 mM PP. All the nanosheets have layered morphologies. The higher PP at 1 and 2 mM PP showed bigger widths than those at 0.3 and 0.5 mM PP.

FIG. 9 shows δ-MnO$_2$ nanosheets having a crumpled shape at all conditions. Although the measurement of width is not feasible from SEM images of crumpled nanosheets, the images clearly show the bigger sizes of particles in 1 and 2 mM PP than that in lower PP concentrations.

Together with the formation of thicker nanosheets, δ-MnO$_2$ nanosheets formed at higher PP concentrations show an increasing red-shift in UV-vis spectra (FIG. 8B). At 0.3 mM PP, the peak is around 380 nm. With increasing PP concentrations, the peak positions move to higher wavelengths, and reach around 410 nm. Specifically, the peak at 1 mM PP was the highest wavelength among the various PP conditions. The nanosize effect can explain the shift in absorbance which occurs when particle size becomes smaller than the exciton (electron-hole pair) in semiconducting nanoparticles. When particles are on the order of nanometers in size, the energy states of bulk material have discrete states. Therefore, quantized levels of the band diagram of a bulk material occur, and a size effect on a band gap arises in semiconducting nanoparticles. The obtained particle sizes and the optical absorbance show well-matched trends.

The disordered δ-MnO$_2$ nanosheets are the one of the most abundant natural Mn (hydr)oxide, and show interesting catalytic properties for water oxidation. The nature-inspired synthesis of randomly stacked δ-$MnO_2$ nanosheets suggests a way to control band gap via the principle of green chemistry. The findings also emphasize the importance of stacking behavior for band gap tuning, which is important for photochemical reactions.

Figure 10:
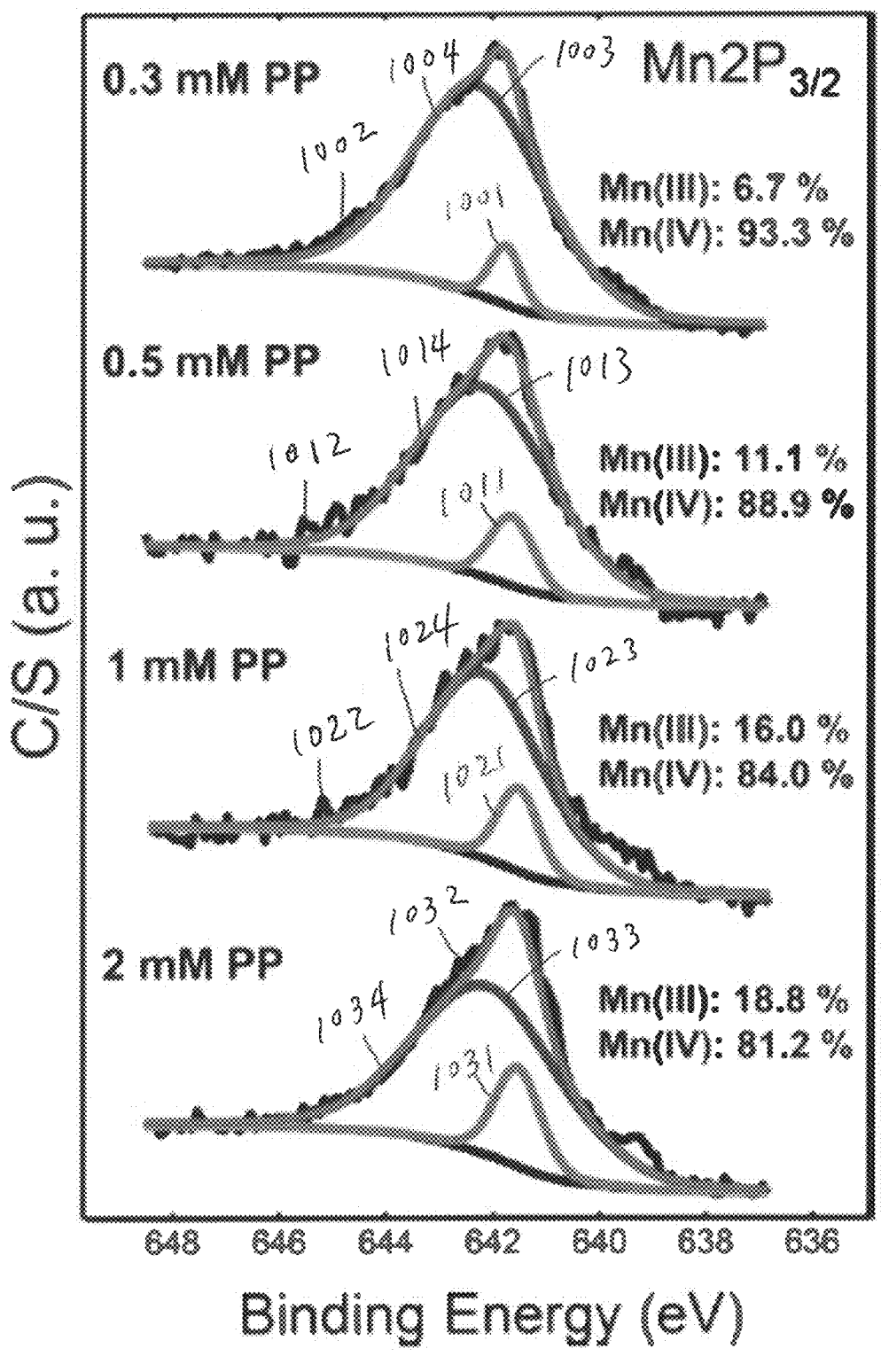
FIG. 10 illustrate increasing portion of Mn(III) in layers confirmed with X-ray photoelectron spectroscopy (XPS) and Gaussian-Lorentzian fitting (Mn(III), 641.8 eV, and Mn(IV), 642.2 eV).
Figure 11A:
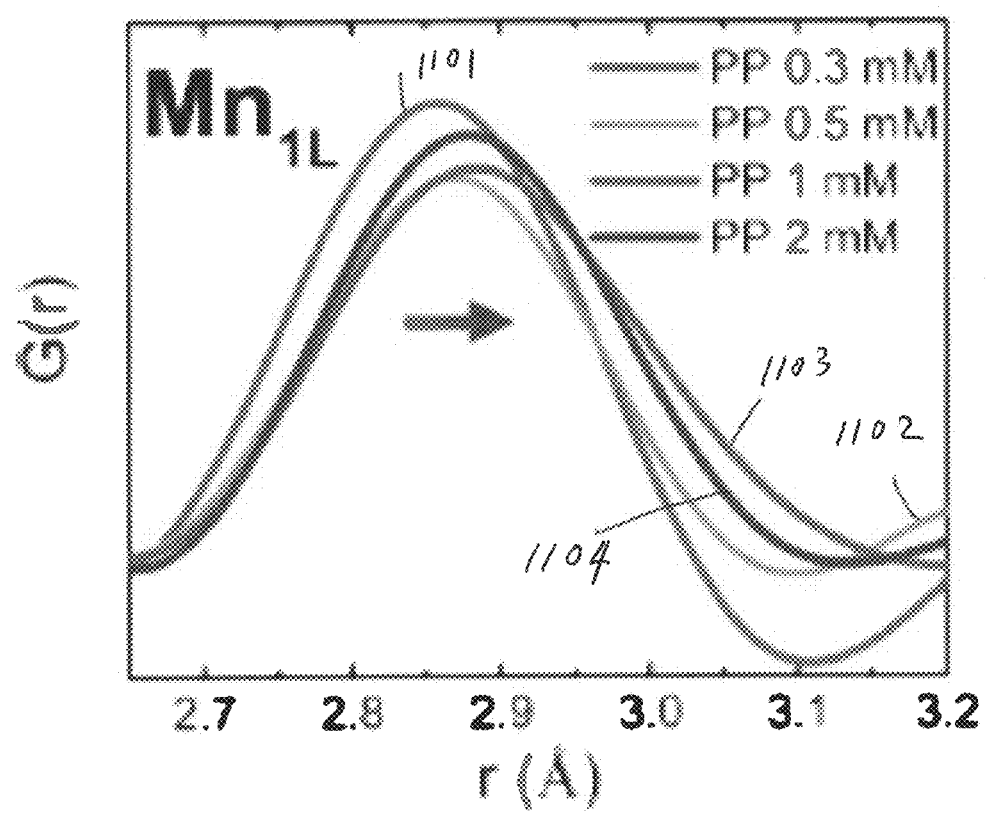
FIGS. 11A-E illustrate shifts of Mn$_L$—Mn$_L$, correlations to longer distances due to the larger portion of Mn(III) in the layers at 1 and 2 mM PP.
Figure 11B:
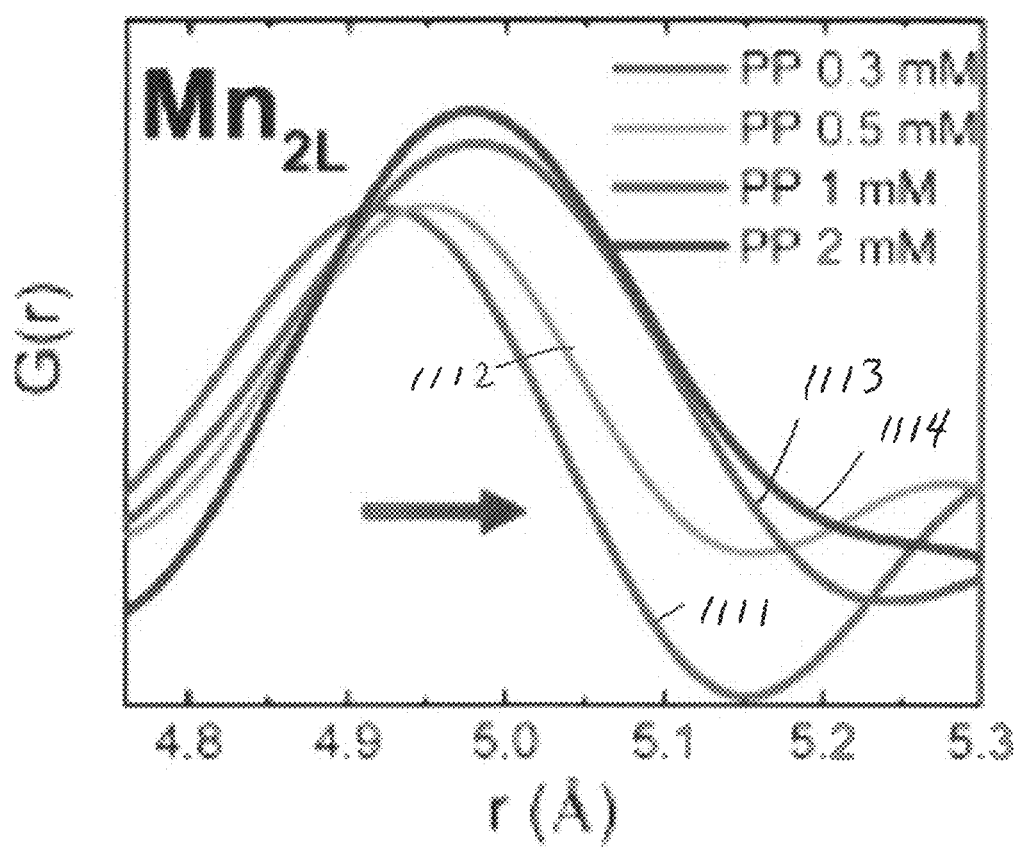
Figure 11C:
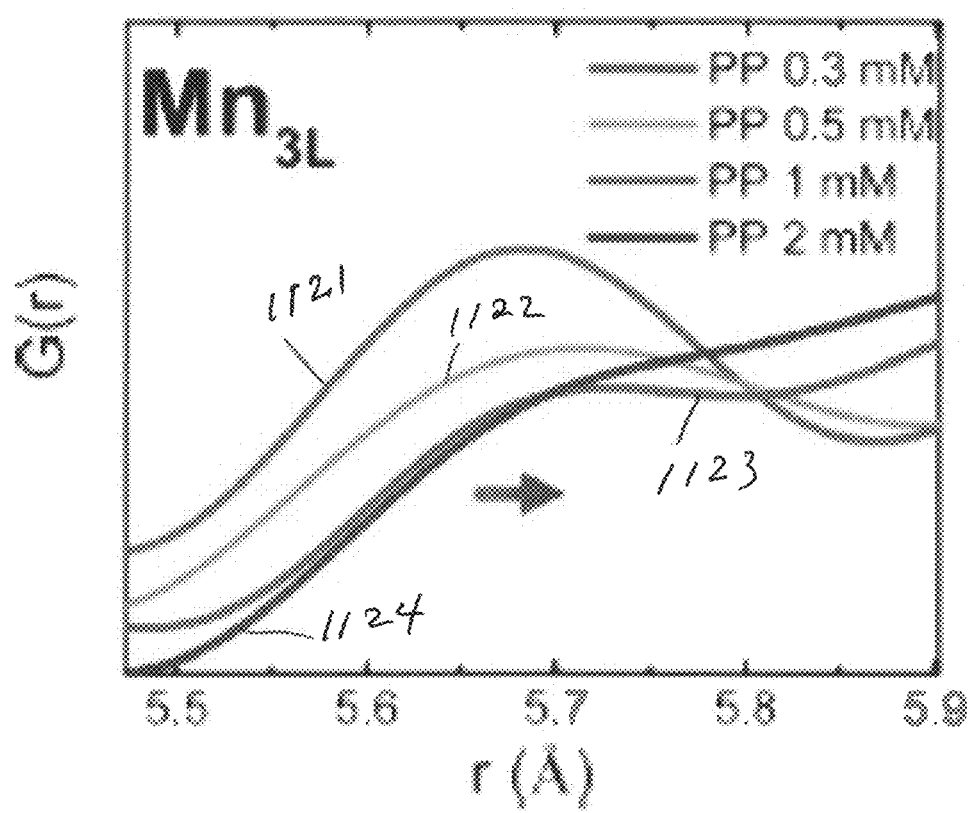
Figure 11D:
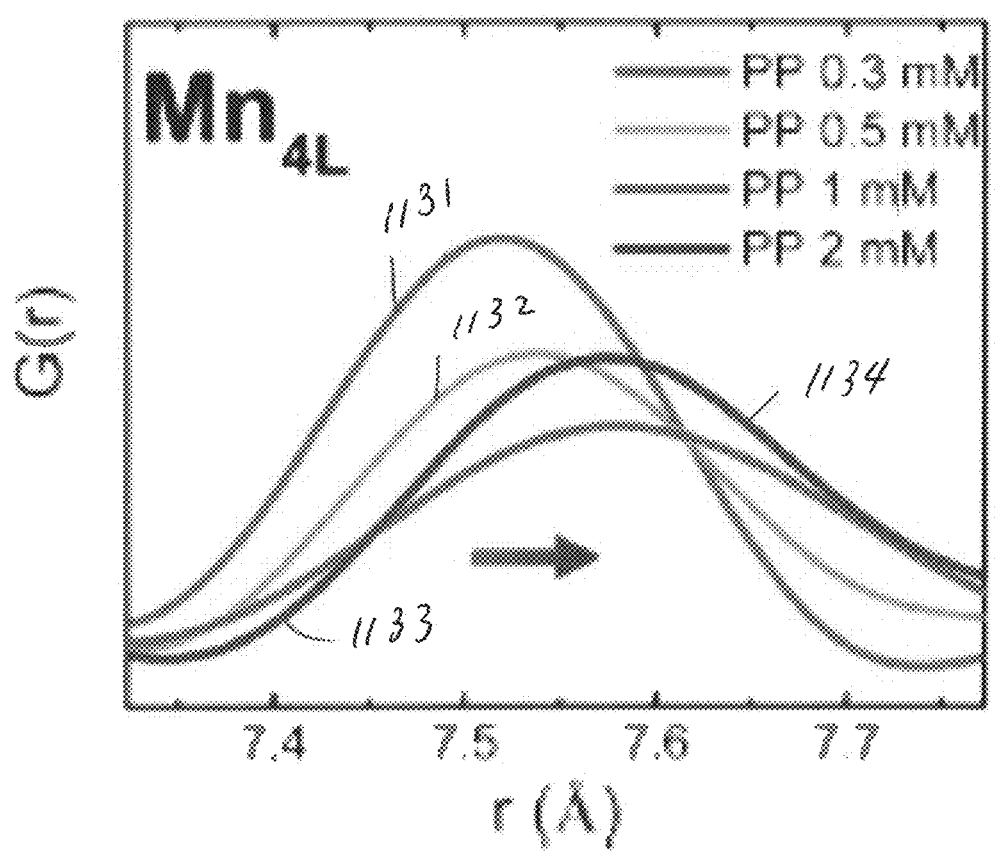
Figure 11E:
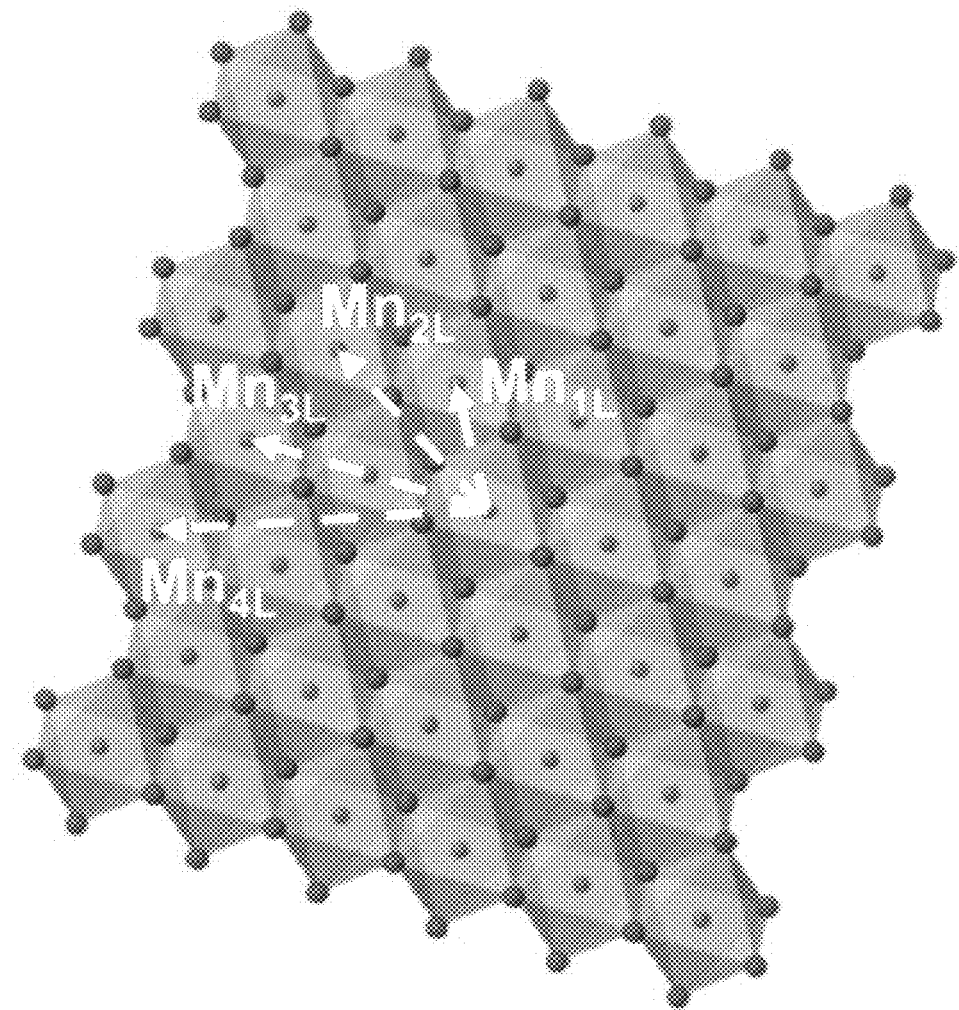

FIG. 10 shows the Mn $2p_{3/2}$ X-ray photoelectron spectroscopy (XPS) spectra and its fitting results. Curves 1001, 1002, 1003, and 1004 represent Mn(III) fitting line, photoline, Mn(IV) fitting line, and accumulated fitting line, respectively, at a PP concentration of 0.3 mM. Curves 1011, 1012, 1013, and 1014 represent Mn(III) fitting line, photoline, Mn(IV) fitting line, and accumulated fitting line, respectively, at a PP concentration of 0.5 mM. Curves 1021, 1022, 1023, and 1024 represent Mn(III) fitting line, photoline, Mn(IV) fitting line, and accumulated fitting line, respectively, at a PP concentration of 1 mM. Curves 1031, 1032, 1033, and 1034 represent Mn(III) fitting line, photoline, Mn(IV) fitting line, and accumulated fitting line, respectively, at a PP concentration of 2 mM. As shown in FIG. 10, at higher PP concentrations, disordered δ-$MnO_2$ nanosheets had greater fractions of Mn(III).

Based on the references to the Mn $2p_{3/2}$ spectrum, to fit a photoline, energy positions of 641.8 and 642.2 eV were used for Mn(III) and Mn(IV), respectively. There is also a small peak at 639.4 eV in all the PP photolines, which may result from adsorbed Mn(II) or interlayer Mn(II). The fraction of Mn(II) is 1-2%. Also, δ-$MnO_2$ nanosheets under all PP concentrations showed no discernible difference in the fraction of Mn(II). Although the XPS fitting does not directly provide the oxidation state of δ-$MnO_2$ nanosheets, with increasing PP concentration, the fitting shows a clear trend of increasing Mn(III) proportion in δ-$MnO_2$ nanosheets. From 0.3 to 1 mM PP, the proportion of Mn(III) increases about three times. δ-$MnO_2$ nanosheets in 1 mM and 2 mM PP showed similar particle sizes and stacking behaviors, and the proportions of Mn(III) were almost similar. The increasing energy gap of Mn 3s spectra with increasing PP concentration also supports the higher fraction of Mn(III).

The increasing portion of Mn(III) in layers was confirmed with X-ray photoelectron spectroscopy (XPS) and Gaussian-Lorentzian fitting (Mn(III), 641.8 eV, and Mn(IV), 642.2 eV). The higher the PP concentration, the higher the Mn(III) fraction in the disordered δ-$MnO_2$ nanosheets.

In the disordered δ-$MnO_2$ nanosheets, Mn(III) can occur in interlayers and/or inside Mn oxide layers. These positions are important because interlayer Mn(III) can compensate for electron deficiency between layers. Also, the interlayer Mn(III) occurs above or below vacant sites, which causes a significant local distortion in the structure. When Mn(III) is inside an Mn oxide layer, its specific orientation also changes the layer structure due to Jahn-Teller distortion. However, XPS information only gives the fraction of Mn(III), not information about its position in δ-$MnO_2$ nanosheets. Thus, to understand the effect of Mn(III) on the observed stacking behaviors under various PP conditions, the X-ray pair distribution function (PDF) was used to analyze the local structures of δ-$MnO_2$ nanosheets.

FIGS. 11A-D illustrate shifts of $Mn_L$—$Mn_L$, correlations to longer distances due to the larger portion of Mn(III) in the layers at 1 and 2 mM PP. Because Mn(III) has the property of Jahn-Teller distortion, when Mn(III) is in the layers, the layers experience an elongation of their structures. Curves 1101, 1102, 1103, and 1104 represent shifts of $Mn_{1L}$-$Mn_L$ at PP concentrations of 0.3 mM, 0.5 mM, 1 mM, and 2 mM, respectively. Curves 1111, 1112, 1113, and 1114 represent shifts of $Mn_{2L}$-$Mn_L$ at PP concentrations of 0.3 mM, 0.5 mM, 1 mM, and 2 mM, respectively. Curves 1121, 1122, 1123, and 1124 represent shifts of $Mn_{3L}$-$Mn_L$ at PP concentrations of 0.3 mM, 0.5 mM, 1 mM, and 2 mM, respectively. Curves 1131, 1132, 1133, and 1134 represent shifts of $Mn_{4L}$-$Mn_L$ at PP concentrations of 0.3 mM, 0.5 mM, 1 mM, and 2 mM, respectively.

Using the analyses of the PDF spectra of $Mn_L$—$Mn_L$ correlations, which are the distances between Mn atoms in the same layer, more Mn(III) within Mn oxide layers occurred at 1 and 2 mM PP concentrations than at 0.3 and 0.5 mM PP concentrations. The most significant changes in the PDF spectra are the $Mn_L$—$Mn_L$ correlations, which are the distances between Mn atoms in layers (FIGS. 11A-D). Strikingly, in the first four layer cationic shells, the $Mn_L$—$Mn_L$ correlation shifts to longer distances as PP concentration increases. The shifts significantly occurred from 0.3 to 1 mM PP. The distances at 1 and 2 mM PP were similar. The $Mn_L$—$Mn_L$, distances increase radially from 2.86 to 2.88 Å for the $Mn_{1L}$ shell, from 4.90 to 4.96 Å for the $Mn_{2L}$ shell, from 5.69 to 5.78 Å for the $Mn_{3L}$ shell, and from 7.50 to 7.57 Å for the $Mn_{4L}$ shell. The shifts in $Mn_L$—$Mn_L$ distances indicate that the amount of Mn(III) in layers increases with an increase of PP concentration, because Mn(III) has Jahn-Teller distortion, and its elongated structure in a layer promotes the increase in $Mn_L$—$Mn_L$ distances.

On the other hand, interlayer Mn(III) ($Mn_L$—$Mn_{1IL}$) occurred unambiguously at 0.3 and 0.5 mM PP. The $Mn_L$-O2 distance of δ-$MnO_2$ nanosheets is around 3.44 Å, and the $Mn_L$—$Mn_{IL}$, distance is around 3.49 Å. When there is no interlayer Mn(III), a peak occurs at around 3.44 Å ($Mn_L$-O2). However, when a higher extent of interlayer Mn(III) occurs in δ-$MnO_2$ nanosheets, the peak shifts to a longer distance between about 3.44 Å and about 3.49 Å. The most significant rightward shift of the peak (3.49 Å) occurred at 0.5 mM PP, and the second most significant rightward shift (3.47 Å) occurred at 0.3 mM PP. The shifted peak indicates more interlayer Mn(III) at 0.3 and 0.5 mM PP than at 1 and 2 mM PP.

The WAXS measurements also indicate the different positions of Mn(III) in the synthesized δ-$MnO_2$ nanosheets under the various PP concentrations. With an increase in PP concentration, the structural symmetry was altered from hexagonal (a=4.92 Å, b=2.84 Å, γ=900, 0.3 and 0.5 mM PP) to orthogonal (a=5.12 Å, b=2.84 Å, γ=89.50, 1 and 2 mM PP) δ-$MnO_2$ nanosheets.

Figure 12A:
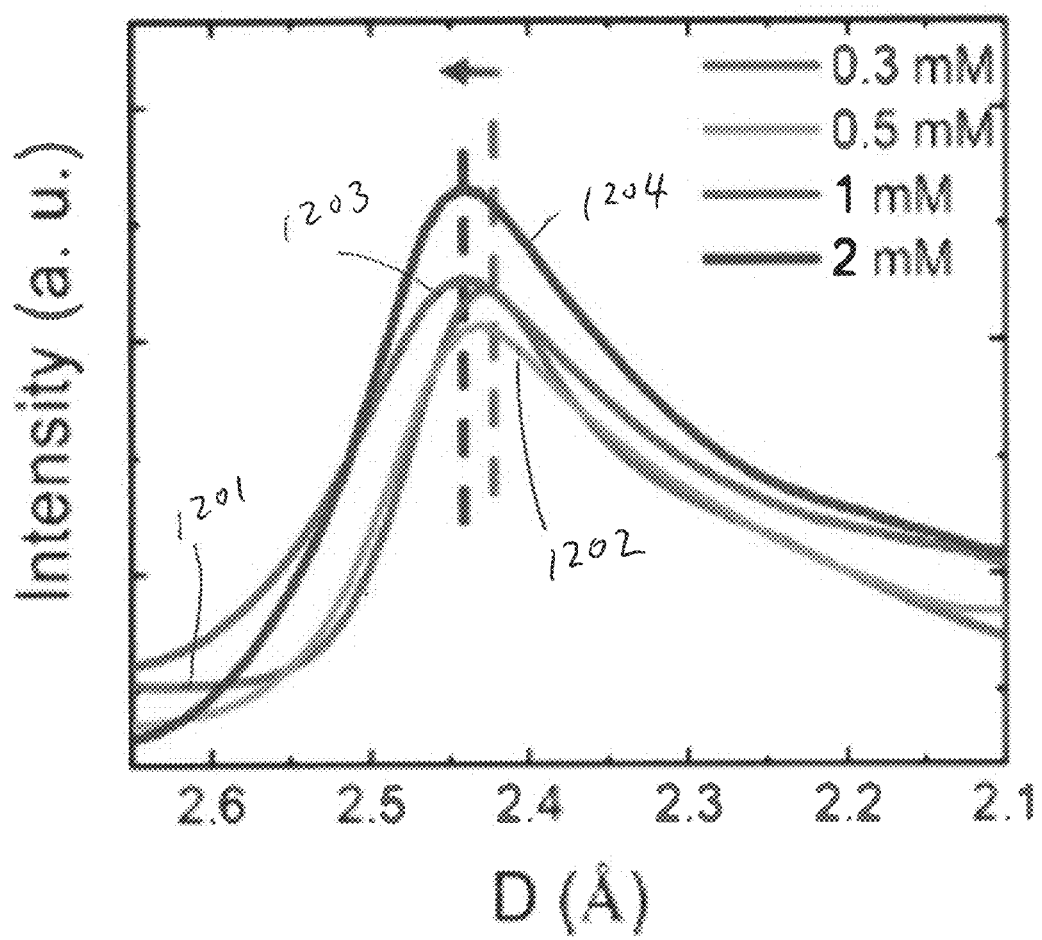
FIGS. 12A-B illustrate wide-angle X-ray scattering (WAXS) measurements data under various PP concentrations to demonstrate symmetry change from hexagonal to orthogonal with the increase of PP observed in the hk bands of (A) (20, 11) and (B) (31, 02)
Figure 12B:
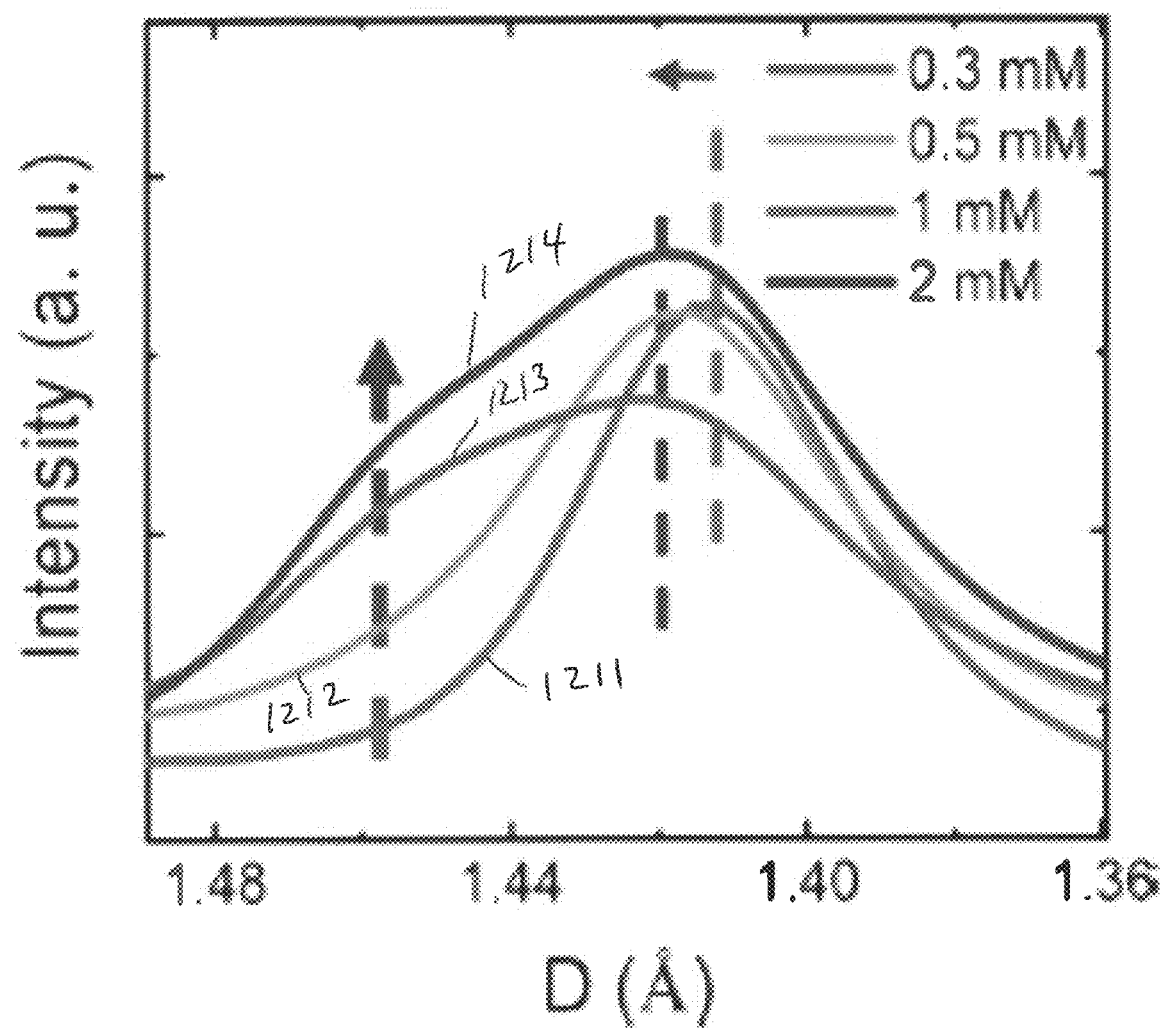

FIGS. 12A-B show WAXS measurements or diffraction results for the hk bands of disordered δ-$MnO_2$ nanosheets under the various PP concentrations. Curves 1201, 1202, 1203, and 1204 represent intensities at PP concentrations of 0.3 mM, 0.5 mM, 1 mM, and 2 mM, respectively for broad hk band detected at around 2.42 Å. Curves 1211, 1212, 1213, and 1214 represent intensities at PP concentrations of 0.3 mM, 0.5 mM, 1 mM, and 2 mM, respectively for broad hk band detected at around 1.42 Å. The symmetry change from hexagonal to orthogonal with the increase of PP was observed in the hk bands of (20, 11) shown in FIG. 12A and (31, 02) shown in FIG. 12B. Hexagonal randomly stacked layers show the hk band of (31, 02) as a one broad peak. However, orthogonal layers show a split of (310) and (020). Also, the hk bands of (20, 11) and (31, 02) shifted slightly leftward with increasing PP concentrations. The split and shift of hk bands indicate the structural change of hexagonal to orthogonal δ-$MnO_2$ nanosheets due to a preferential ordering of Mn(III) in the layers.

At 1 and 2 mM PP, the reflection band shows a split, with (310) at 1.46 Å and (020) at 1.42 Å (FIG. 12B). Also, the hk bands are slightly shifted (about 0.01 Å) left from the peaks in 0.3 and 0.5 mM PP (horizontal arrow). The split and shift of hk bands occurs in orthogonal δ-MnO$_2$ nanosheets due to a preferential ordering of Mn(III) in the Mn oxide layers. Hexagonal δ-MnO$_2$ nanosheets show a (31, 02) band at 1.41 Å without splitting of the peak, due to the hexagonal unit-cell symmetry. The two different structural symmetries occur primarily because of differing placements of Mn(III) in the Mn oxide structures (i.e., either interlayer or inside the Mn oxide layer) and differing placements of vacancies. Orthogonal δ-MnO$_2$ nanosheets have a relatively high proportion of Mn(III) in layers with fewer vacant sites. To the contrary, in hexagonal δ-MnO$_2$ nanosheets, Mn(III) is placed above and below the layer plane in corner-sharing sites (interlayer Mn(III)) at vacancies. Therefore, hexagonal δ-MnO$_2$ nano-sheets have less Mn(III) and more vacant sites in layers than orthogonal δ-MnO$_2$ nanosheets.

PDF and WAXS results reveal that δ-MnO$_2$ nanosheets in 1 and 2 mM PP concentrations have Mn(III) predominantly in Mn oxide layers, and have relatively fewer vacant sites within layers than those at 0.3 and 0.5 mM PP. In XPS analysis, more Mn(III) were found in δ-MnO$_2$ nanosheets at higher PP concentrations. In δ-MnO$_2$ having a small fraction of Mn(III) at low PP concentrations, the structure compels Mn(III) to migrate from the layer to the interlayer to reduce local strains. A vacancy is then produced at the position of the migrated Mn(III). When δ-MnO$_2$ has a high fraction of Mn(III) at high PP concentrations, δ-MnO$_2$ has an orthogonal structure with Mn(III)-rich rows in the layers. This explains the presence of interlayer Mn(III) and the greater number of vacant sites at 0.3 and 0.5 mM PP, as well as the layered Mn(III) structure and fewer vacant sites at 1 and 2 mM PP.

The poorer stacking behavior at lower PP concentrations can result from the structural difference. The more abundant vacant sites, which cause poorer stacking behavior and growth of nanosheets, at 0.3 and 0.5 mM PP generate considerable local distortion in the layer near the vacant sites through displacements of the neighboring Mn and O. Therefore, at lower PP concentrations, with more vacant sites, poorer stacking behavior and unfeasible particle growth in width and thickness are expected in δ-MnO$_2$ nanosheets. Also, the kinetics of Mn(III)-PP and δ-MnO$_2$ under the varied PP conditions can contribute to the observed stacking behavior. Because faster formation of δ-MnO$_2$ nanosheets occurred at the lower PP concentration (FIGS. 11A-E), poorer stacking behavior and smaller particle sizes can also occur due to the shorter time for structural rearrangement of initially polymerized MnO$_2$, which can contain numerous vacancy defects.

Based on PDF and WAXS structural analyses, better stacking of δ-MnO$_2$ nanosheets was found in 1 and 2 mM PP than 0.5 mM PP, which had more dominant interlayer Mn(III) and a red-shift in optical absorbance caused by the effect of nanosize layer thicknesses. Also, although 2 mM PP showed more Mn(III) in layers based on the slightly longer Mn$_L$—Mn$_L$ distance than that in 1 mM PP, 1 mM PP showed peak optical absorbance at a higher wavelength than for 2 mM PP, and the red-shift trends were correlated with particle thickness. Therefore, the slight shift of optical absorption spectra in the disclosure can be attributed to the effect of nanosize layer thickness, rather than the proportion of Mn(III) in layers.

Interestingly, although there was no shift of the absorbance peak related to the presence of Mn(III), an absorbance peak was found for Mn(III), which could be highly reactive Mn(III) involved in the water oxidation catalysis. Under 1 and 2 mM PP, the absorbance hump was detected at around 510 nm in the UV-vis spectra. The absorbance peak was weaker with a decrease of PP concentrations from 1 to 0.3 mM PP. This trend matches well with the increasing extent of Mn(III) in layers and the total Mn(III) fraction in the structure with increased PP concentrations observed. The reactive Mn(III) may relate to Mn(III) placed in actual layers or to the total amount of Mn(III) in the structure, based on the extent of Mn(III) in layers and total Mn(III) fraction in the structure.

The disclosure demonstrates the effects of PP for the formation of disordered δ-MnO$_2$ nanosheets. The increasing PP concentration makes formation kinetics of disordered δ-MnO$_2$ nanosheets slower, and changes birnessite structure from hexagonal to orthogonal in the range of 0.3 to 2 mM PP. The fastest formation of δ-MnO$_2$ nanosheets and the lowest maximum concentration of Mn(III)-PP occurred at 0.3 mM PP. With increased PP concentration, enhanced stacking of δ-MnO$_2$ nanosheets occurred, and particle sizes increased. The red-shift of optical absorbance with thicker layers elucidates the effects of the particle size of δ-MnO$_2$ nanosheets. The higher the PP concentration, the higher the proportion of Mn(III) in δ-MnO$_2$ nanosheets layers. At 1 and 2 mM PP, orthogonally structured δ-MnO$_2$ nanosheets formed, having Mn(III) dominantly in layers with fewer vacant sites than in 0.3 and 0.5 mM PP. Hexagonal δ-MnO$_2$ nanosheets formed in 0.3 and 0.5 mM PP, having Mn(III) dominantly in the interlayers with more vacancy sites than found in 1 and 2 mM PP.

In some embodiments, the PP concentration is equal to or greater than 0.3 mM. In some embodiments, the PP concentration is equal to or greater than 0.5 mM. In some embodiments, the PP concentration is equal to or greater than 0.7 mM. In some embodiments, the PP concentration is equal to or greater than 0.9 mM. In some embodiments, the PP concentration is equal to or greater than 1.1 mM. In some embodiments, the PP concentration is equal to or greater than 1.3 mM. In some embodiments, the PP concentration is equal to or greater than 1.5 mM. In some embodiments, the PP concentration is equal to or greater than 1.7 mM. In some embodiments, the PP concentration is equal to or greater than 1.9 mM.

In some embodiments, the PP concentration is equal to or less than 2 mM. In some embodiments, the PP concentration is equal to or less than 1.9 mM. In some embodiments, the PP concentration is equal to or less than 1.7 mM. In some embodiments, the PP concentration is equal to or less than 1.5 mM. In some embodiments, the PP concentration is equal to or less than 1.3 mM. In some embodiments, the PP concentration is equal to or less than 1.1 mM. In some embodiments, the PP concentration is equal to or less than 0.9 mM. In some embodiments, the PP concentration is equal to or less than 0.7 mM. In some embodiments, the PP concentration is equal to or less than 0.5 mM.

In engineered systems, disordered δ-MnO$_2$ nanosheets are interesting catalysts because of their variable structure and oxidation states. For example, Mn(III) in δ-MnO$_2$ nanosheets is believed to be important in water oxidation. Thus, a structural modification in synthesizing δ-MnO$_2$ nanosheets to include stable Mn(III) in a water oxidation catalyst would enhance its performance. Also, vacant sites in δ-MnO$_2$ nanosheets affect the ion-exchange and absorption in inter-layers. The disclosure provides useful information about how to synthesize disordered δ-MnO$_2$ nanostructures under varied PP concentrations, and how to tune their oxidation state and structural properties in an environmentally friendly way. Also, the disclosure shows the importance of soluble Mn(III) and chelators (e.g., PP), which are believed to be abundant in environmental systems, for explaining how nature can produce δ-$MnO_2$ nanosheets with varied oxidation states.

III. Electrochemical Properties of Photochemically-Synthesized Mn Oxide Nanosheets Cyclic voltammetry (CV) was performed on a BioLogic VMP3 multipotentiostat. Commercially purchased and photochemically-synthesized $MnO_2$ nanosheets were dispersed by sonication in solution of 0.1 M $LiClO_4$ with 1% poly (vinyl alcohol). The dispersions were then dropped onto a fibrous hard carbon paper current collector. After air drying, the carbon paper was used as the working electrode in a three-electrode potentiostat cell. A bundled length of platinum mesh with a platinum wire lead served as the counter electrode. The reference electrode (Ag/AgCl in 3M NaCl) was pointed directly at the working electrode surface to minimize solution resistance. 1 M $Na_2SO_4$ solution was used as the electrolyte.

Figure 13A:
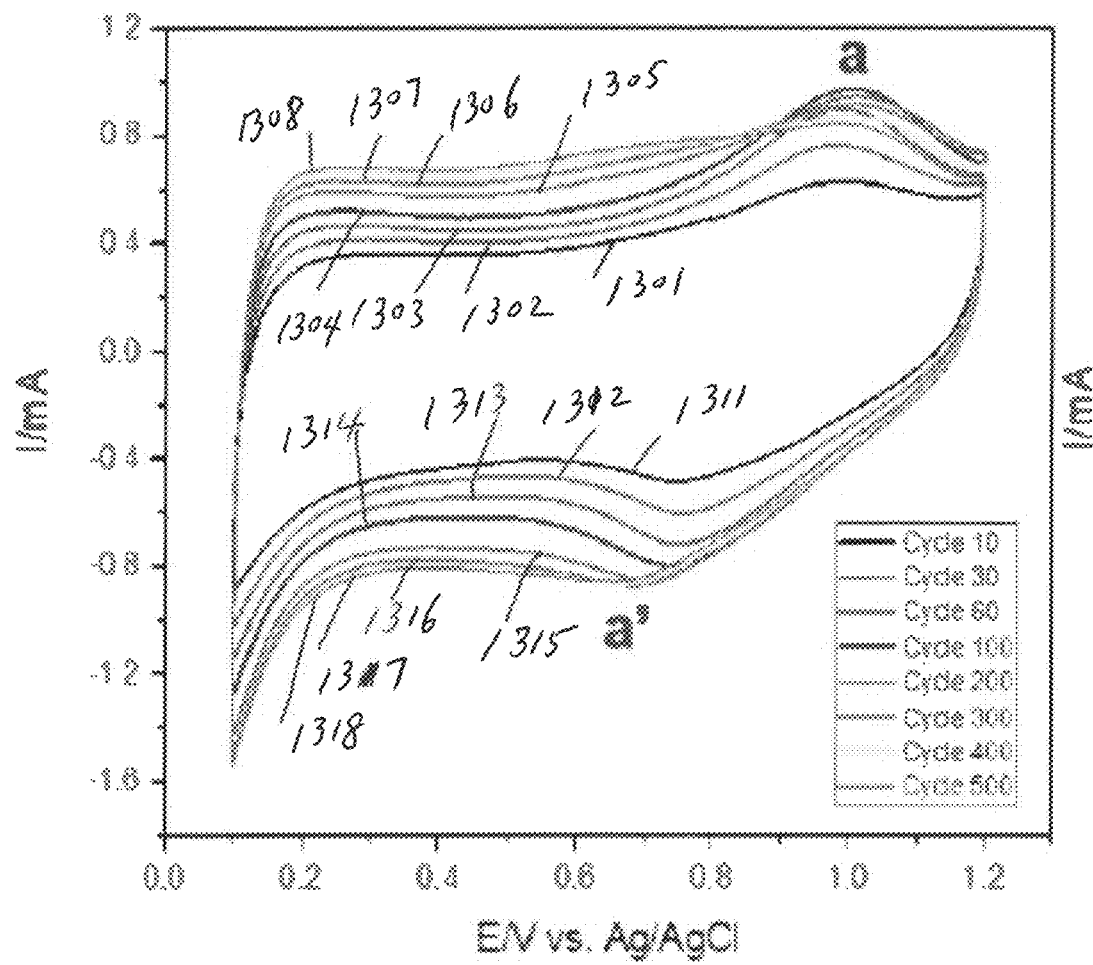
FIGS. 13A-B illustrate cyclic voltammetry curves of (A) commercial and (B) photochemically-synthesized MnO$_2$ samples.
Figure 13B:
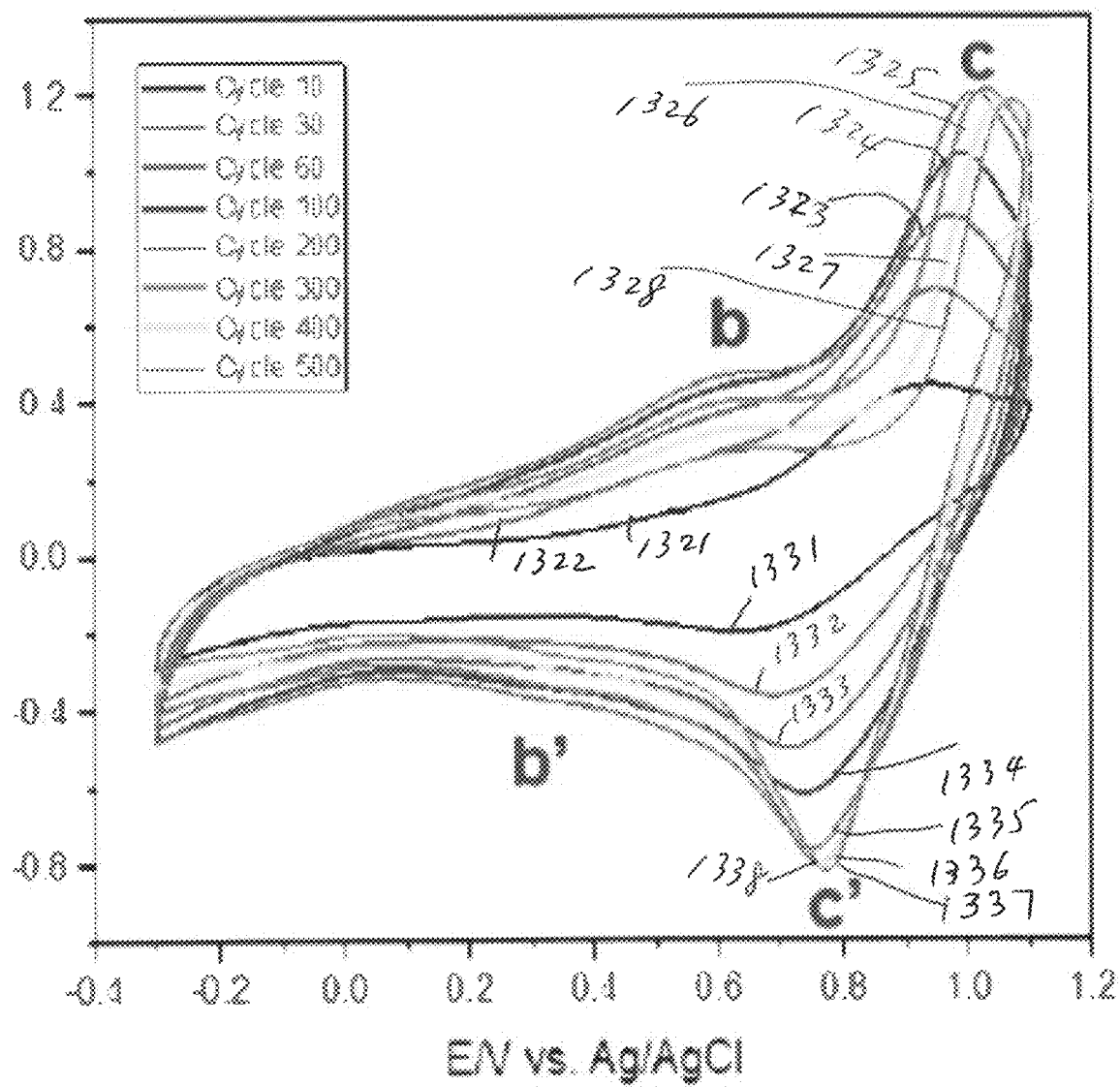

FIGS. 13A-B illustrate cyclic voltammetry curves of commercially available $MnO_2$ samples (FIG. 13A) and photochemically-synthesized $MnO_2$ samples (FIG. 13B). As shown in FIG. 13 A, anodic curves 1301, 1302, 1303, 1304, 1305, 1306, 1307, and 1308 represent 10 cycles, 30 cycles, 60 cycles, 100 cycles, 200 cycles, 300 cycles, 400 cycles, and 500 cycles, respectively, for the commercially available $MnO_2$ samples. Cathodic curves 1311, 1312, 1313, 1314, 1315, 1316, 1317, and 1318 represent 10 cycles, 30 cycles, 60 cycles, 100 cycles, 200 cycles, 300 cycles, 400 cycles, and 500 cycles, respectively, for the commercially available $MnO_2$ samples.

As shown in FIG. 13 B, anodic curves 1321, 1322, 1323, 1324, 1325, 1326, 1327, and 1328 represent 10 cycles, 30 cycles, 60 cycles, 100 cycles, 200 cycles, 300 cycles, 400 cycles, and 500 cycles, respectively, for the photochemically-synthesized $MnO_2$ samples. Cathodic curves 1331, 1332, 1333, 1334, 1335, 1336, 1337, and 1338 represent 10 cycles, 30 cycles, 60 cycles, 100 cycles, 200 cycles, 300 cycles, 400 cycles, and 500 cycles, respectively, for the photochemically-synthesized $MnO_2$ samples.

Potential was swept at 25 mV/s between 1.2 V and 0.1 V, and between 1.1 V and −0.3 V, respectively. The current is not normalized for electrode masses. Thus, the capacitance of two samples could not directly be compared by the area of the curve. However, the fact is that the photochemically-synthesized sample mass was of a much smaller quantity compared to commercially available $MnO_2$ samples.

Based on the shape of the curve, photochemically-synthesized $MnO_2$ samples appear to be more resistive due to the gradual slope at switching potentials 0.1 V and 1.2 V. A characteristic redox pair is visible at around 0.75 V cathodic/ 0.95 V anodic ((a', a) and (c', c)) for both samples, suggesting they have similar redox reactions for Mn(IV) to Mn(III). A redox pair at 0.4 V cathodic/0.6 V anodic (b', b) is observed for photochemically-synthesized $MnO_2$ samples, which can be related to the reaction for Mn(III) to Mn(II) and result in a higher capacitance. This pair can also explain the slower, more resistive behavior of the photochemically-synthesized $MnO_2$ samples.

For the first 200 cycles, the redox pair at 0.75/0.95 V steadily increases for both samples, due to initial impregnation of the electrode with electrolyte. The redox pair decreases after 200 cycles for commercial $MnO_2$ samples, possibly due to the breakdown of the $MnO_2$ into soluble redox species like $Mn^{2+}$, $Mn^{3+}$, and $Mn^{4+}$. For photochemically-synthesized $MnO_2$, the redox pair at 0.75/0.95 V steadily shifts to higher voltage after 200 cycles, which can be related to the crystalline phase transformation of $MnO_2$. The intensity of redox pair at 0.75/0.95 V remains stable after 500 cycles.

IV. Applications

Abiotic fast oxidation of $Mn^{2+}$(aq) to Mn(IV) showed an oxidation rate comparable to that of biotic processes, which have thus for been considered to be the dominant contributor in the oxidation of $Mn^{2+}$(aq) to Mn(IV). The abundance of sunlight and nitrate in atmospheric and aqueous systems provides abundant Mn(IV)$O_2$ minerals.

Without any external inputs of electricity and heat energy, δ-$MnO_2$ nanosheets can be obtained with tunable thicknesses and structures. Such δ-$MnO_2$ nanosheets can be used as a cathode material in Li-ion batteries. Also, δ-$MnO_2$ nanosheets are an emerging catalyst for water oxidation.

Much effort has been applied to remediate contamination of aqueous Mn. Using the methods disclosed herein, the remediation process could be more efficient, cheaper, and faster. Also, the remediation process can generate a secondary product, δ-$MnO_2$ nanosheets, which are a two-dimensional (2D) nanoparticle structure.

The synthesis of δ-$MnO_2$ nanosheets can be done via a very simple pathway, one-pot synthesis with green chemistry. Also, the nitrate solution after synthesis can be reused after separating synthesized particles. This simple process and reusable conditions are beneficial in reduction of the operation cost of the process and the production of waste materials.

The tunable sizes, structures, and oxidation states of δ-$MnO_2$ nanosheets obtained from the sunlight-mediated sustainable synthesis can be diversely applicable on the basis of engineered needs.

The disclosure provides a green chemistry pathway to make δ-$MnO_2$ nanosheets. No external energy source is required.

The present process can be very effective in reduction of operation costs, not only due to the energy efficiency, but also due to the simple and reusable process.

δ-$MnO_2$ nanosheets have been widely used in engineered systems as cathodes in Li-ion batteries and as catalysts.

In any aqueous Mn-contaminated places, or in engineered systems having very high $Mn^{2+}$(aq) concentration of contaminant (e.g., a steel company), this invention can enable remediating the contamination (precipitating the aqueous $Mn^{2+}$(aq) to Mn(IV) and generating useful materials).

The properties of δ-$MnO_2$ nanosheets can be tunable by adjusting reaction rates and ligands. Thus, without external energy, the size, oxidation state, and structure of δ-$MnO_2$ nanosheets can be controlled.

Having described several embodiments, it will be recognized by those skilled in the art that various modifications, alternative constructions, and equivalents may be used without departing from the spirit of the disclosure. Additionally, a number of well-known processes and elements have not been described in order to avoid unnecessarily obscuring the embodiments disclosed herein. Accordingly, the above description should not be taken as limiting the scope of the document.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall there between.

What is claimed:

1. A method of forming birnessite δ-$MnO_2$ nanosheets, the method comprising oxidizing manganese ($Mn^{2+}$) in the presence of a source of nitrate and a light source, the light source comprising one or more of a UV lamp containing UV light above 300 nm, or a Xe lamp.

2. The method of claim 1, further comprising:
   irradiating an aqueous solution comprising $Mn^{2+}$ (aq) and a nitrate solution with the light source;
   oxidizing the $Mn^{2+}$ (aq) to form Mn(IV) in the nitrate solution;
   creating superoxide from photodecomposition of nitrate; and
   generating disordered δ-$MnO_2$ nanosheets.

3. The method of claim 2, the step of oxidizing $Mn^{2+}$ to Mn(IV) comprising oxidizing $Mn^{2+}$ to form Mn(III) and oxidizing the Mn(III) to form the Mn(IV).

4. The method of claim 2, further comprising increasing a concentration of the nitrate solution to accelerate the formation of δ-$MnO_2$ nanosheets.

5. The method of claim 2, wherein the concentration of the nitrate solution is at least 0.1 mM.

6. The method of claim 2, wherein the formation of δ-$MnO_2$ nanosheets takes a time ranging from 0.5 hrs to 6 hrs.

7. The method of claim 2, wherein the abiotic formation rate of the δ-$MnO_2$ nanosheets is comparable to the formation rate of δ-$MnO_2$ in microbial processes.

8. A method of oxidizing manganese ($Mn^{2+}$) to Mn(IV), the method comprising contacting $Mn^{2+}$ to a source of nitrate and a light source, the light source comprising one or more of a UV lamp containing UV light above 300 nm, or a Xe lamp.

9. The method of claim 8, further comprising: preparing an aqueous solution comprising $Mn^{2+}$ (aq), nitrate, and pyrophosphate (PP) having a concentration of at least 0.3 mM; irradiating the aqueous solution using a light source; oxidizing the $Mn^{2+}$ (aq) to form Mn(IV); creating superoxide from photodecomposition of nitrate; and synthesizing disordered δ-$MnO_2$ nanosheets, wherein the stacking of δ-$MnO_2$ nanosheets is enhanced by changing the birnessite structure from hexagonal to orthogonal in the presence of PP.

10. The method of claim 9, wherein the PP is up to 2 mM.

11. The method of claim 9, wherein the proportion of Mn(III) in δ-$MnO_2$ nanosheets increases with the PP concentration.

12. The method of claim 9, wherein when the PP concentration is between 1 mM and 2 mM, orthogonally structured δ-$MnO_2$ nanosheets are formed to have Mn(III) dominantly in layers with fewer vacant sites than that when the PP concentration is between 0.3 mM and 0.5 mM, and when the PP concentration is between 0.3 mM and 0.5 mM, hexagonal structured δ-$MnO_2$ nanosheets are formed to have Mn(III) dominantly in the interlayers with more vacant sites than that when the PP concentration is between 1 mM and 2 mM.

13. The method of claim 9, the step of oxidizing $Mn^{2+}$ to form Mn(IV) comprising oxidizing $Mn^{2+}$ to form Mn(III) and oxidizing the Mn(III) to form the Mn(IV).

14. The method of claim 9, wherein the formation of δ-$MnO_2$ nanosheets takes a time ranging from 0.5 hrs to 6 hrs.

* * * * *